US012654460B2

(12) United States Patent
Oshitani et al.

(10) Patent No.: US 12,654,460 B2
(45) Date of Patent: Jun. 16, 2026

(54) LIQUID DISCHARGE SYSTEM AND FILTER STATE DETERMINATION METHOD

(71) Applicant: BROTHER KOGYO KABUSHIKI KAISHA, Nagoya (JP)

(72) Inventors: Yuta Oshitani, Nagoya (JP); Akihiro Kobayashi, Yokkaichi (JP); Kenta Hasebe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 226 days.

(21) Appl. No.: 18/756,346

(22) Filed: Jun. 27, 2024

(65) Prior Publication Data

US 2025/0001762 A1 Jan. 2, 2025

(30) Foreign Application Priority Data

Jun. 30, 2023 (JP) ................................ 2023-107963

(51) Int. Cl.
*B41J 2/175* (2006.01)
*B41J 2/045* (2006.01)

(52) U.S. Cl.
CPC ....... *B41J 2/17563* (2013.01); *B41J 2/04513* (2013.01); *B41J 2/17566* (2013.01)

(58) Field of Classification Search
CPC B41J 2/17563; B41J 2/04513; B41J 2/17566; B41J 2/19; B41J 2/20; B41J 2/18
USPC ........................................................... 347/93
See application file for complete search history.

(56) References Cited

U.S. PATENT DOCUMENTS

| | | | | |
|---|---|---|---|---|
| 10,875,320 B2 | 12/2020 | Fukuta et al. | | |
| 2010/0177148 A1* | 7/2010 | Asami | B41J 2/18 347/85 | |
| 2019/0263137 A1* | 8/2019 | Fukuta | B41J 29/13 | |
| 2022/0016888 A1* | 1/2022 | Shinoda | B41J 2/16544 | |
| 2022/0379603 A1 | 12/2022 | Hori et al. | | |

FOREIGN PATENT DOCUMENTS

| | | |
|---|---|---|
| JP | 2010228147 A | 10/2010 |
| JP | 2016112794 A | 6/2016 |

OTHER PUBLICATIONS

Extended European Search Report issued Oct. 31, 2024, in corresponding European Patent Application No. 24182708.8, 8 pages.

* cited by examiner

*Primary Examiner* — Jason S Uhlenhake
*Assistant Examiner* — Alexander D Shenderov
(74) *Attorney, Agent, or Firm* — Element IP, PLC

(57) ABSTRACT

The liquid discharge system includes a head configured to discharge the liquid, a supply tank, a discharge tank, a pump, a first filter, a second filter, a first liquid amount sensor configured to detect an amount of the liquid stored in the supply tank, a second liquid amount sensor configured to detect an amount of the liquid stored in the discharge tank, and a controller configured to determine a state of the first filter, based on a first change amount or a second change amount, the first change amount being amount of change in a detection value of the first liquid amount sensor, the second change amount being amount of change in a detection value of the second liquid amount sensor, and determine a state of the second filter, based on a value or a rotational speed of the pump.

23 Claims, 21 Drawing Sheets

LIQUID DISCHARGE SYSTEM AND FILTER STATE DETERMINATION METHOD

REFERENCE TO RELATED APPLICATIONS

This application claims priority from Japanese Patent Application No. 2023-107963 filed on Jun. 30, 2023. The entire content of the priority application is incorporated herein by reference.

BACKGROUND ART

A liquid discharge system that discharges liquid (ink or the like), from a head having a nozzle, onto a medium (paper or the like) to form an image on the medium is used. In such a liquid discharge system, a filter is disposed in a channel for supplying the liquid to the nozzle, in order to prevent foreign matter mixed in the liquid from reaching the nozzle.

As a technique that can grasp a state of a filter provided in a liquid discharge system, a related art discloses an ink jet printer including an "estimation unit configured to estimate a degree of clogging of a filter, based on a decrease in volume of ink droplets". A related art discloses a liquid ejecting apparatus including a "control unit configured to determine a degree of clogging of a filter, in accordance with a pressure difference between a flow pressure of ink flowing in a first region located on an ink cartridge side relative to the filter in an ink supply tube and a flow pressure of ink flowing in a second region located on a recording head side relative to the filter in the ink supply tube".

A liquid discharge system is used, in which a filter is disposed in each of a head channel through which liquid flows from a supply tank to a discharge tank through a head and a supply channel through which liquid flows to the supply tank. When determining a state of the filter in such a liquid discharge system, it is difficult to execute a good determination even by using the estimation unit described in the related art. This is because it cannot be determined whether a decrease in volume of ink droplets is caused by clogging of the filter disposed in the head channel or by clogging of the filter disposed in the supply channel.

It is also difficult to execute a good determination even by using the control unit described in the related art. This is because it is not easy to dispose a sensor or the like in a limited space in a vicinity of the head channel and acquire flow pressures of ink upstream and downstream of the filter disposed in the head channel.

In view of the above, an object of the present disclosure is to provide a technique that can determine which filter has an abnormality in a liquid discharge system provided with a filter in each of a head channel and a supply channel.

SUMMARY

A liquid discharge system for discharging liquid, the liquid discharge system including: a head configured to discharge the liquid, the head having an inlet for supplying the liquid to the head and an outlet for discharging the liquid from the head; a supply tank connected to the inlet; a discharge tank connected to the outlet; a pump configured to cause the liquid to flow, the liquid being in a supply channel for supplying the liquid to the supply tank; a first filter located in a head channel extending from the supply tank to the discharge tank through the head; a second filter located in the supply channel; a first liquid amount sensor configured to detect an amount of the liquid stored in the supply tank; a second liquid amount sensor configured to detect an amount of the liquid stored in the discharge tank; and a controller configured to: determine a state of the first filter, based on a first change amount or a second change amount, the first change amount being amount of change in a detection value of the first liquid amount sensor in a prescribed period, the second change amount being amount of change in a detection value of the second liquid amount sensor in a prescribed period; and determine a state of the second filter, based on a value or a rotational speed of the pump, the value being based on the first change amount and the second change amount.

A filter state determination method performed by a controller of a liquid discharge system configured to discharge liquid, in which the liquid discharge system includes: a head configured to discharge the liquid, the head having an inlet for supplying the liquid to the head and an outlet for discharging the liquid from the head; a supply tank connected to the inlet; a discharge tank connected to the outlet; a pump configured to cause the liquid to flow, the liquid being in a supply channel for supplying the liquid to the supply tank; a first filter located in a head channel extending from the supply tank to the discharge tank through the head; a second filter located in the supply channel; a first liquid amount sensor configured to detect an amount of the liquid stored in the supply tank; and a second liquid amount sensor configured to detect an amount of the liquid stored in the discharge tank, and the filter state determination method includes: determining a state of the first filter, based on a first change amount or a second change amount, the first change amount being amount of change in a detection value of the first liquid amount sensor in a prescribed period, the second change value being amount of change in a detection value of the second liquid amount sensor in a prescribed period; and determining a state of the second filter, based on a value or a rotational speed of the pump, the value being based on the first change amount and the second change amount.

DESCRIPTION

Embodiments

A printer 1000, which is an example of a "liquid discharge system", according to an embodiment will be described with reference to FIGS. 1 to 18B.

<Printer 1000>

Figure 1:
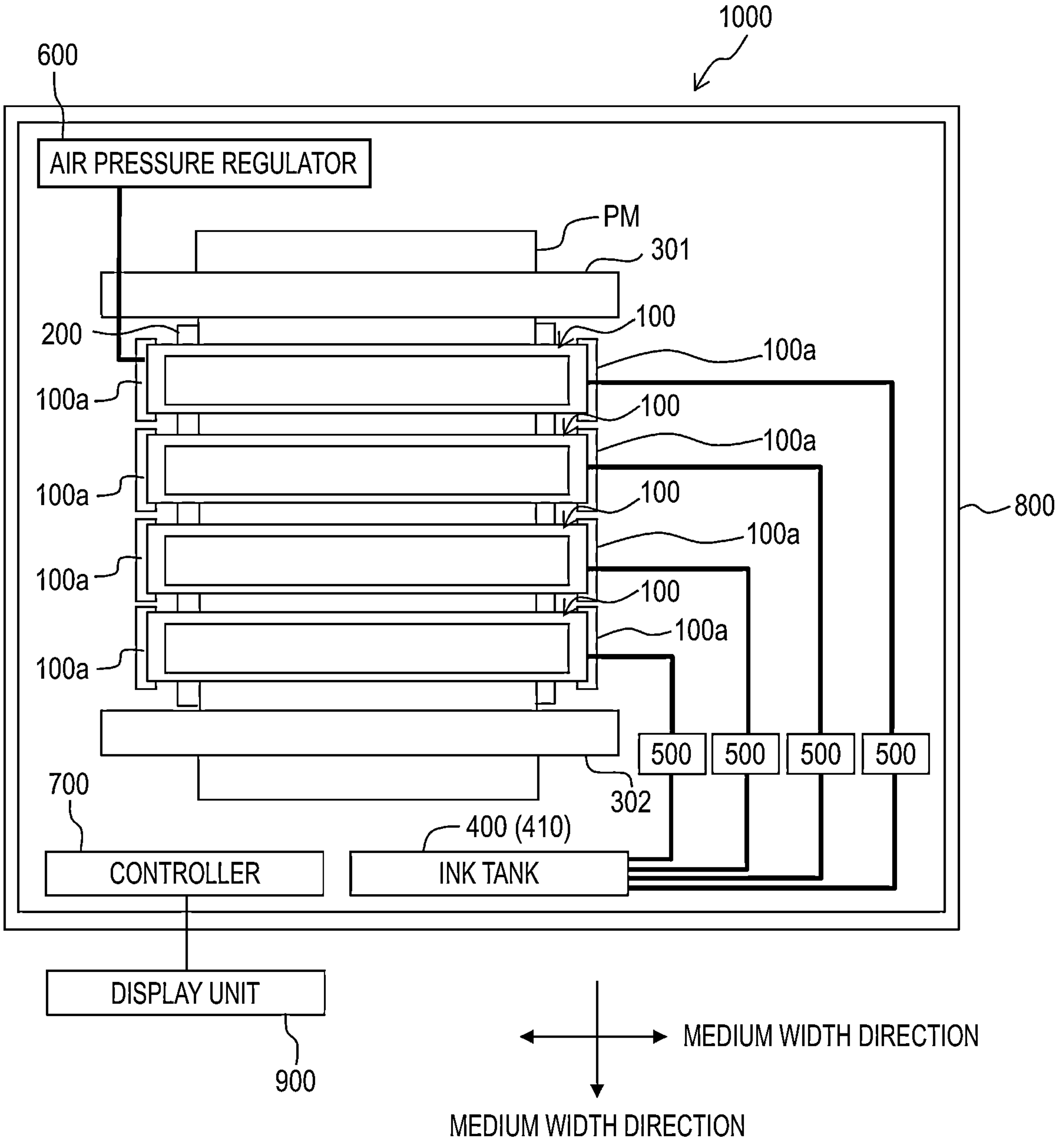
FIG. 1 is a schematic configuration diagram of a printer.

As shown in FIG. 1, the printer 1000 mainly includes four head systems 100, a platen 200, conveyance rollers 301 and 302, an ink tank 400, hydraulic pneumatics modules (HPMS) 500, an air pressure regulator 600, a controller 700, and a case 800 that accommodates these components. The printer 1000 further includes a display unit 900 located outside the case 800.

Regarding the printer 1000, a direction in which the conveyance rollers 301 and 302 are arranged, that is, a direction in which a medium PM is conveyed during image formation is referred to as a "conveyance direction". A direction extending in a horizontal plane and perpendicular to the conveyance direction is referred to as a "medium width direction".

Each of the four head systems 100 is a so-called line head (head bar), and is supported by a frame 100*a* at two end portions in the medium width direction. A specific structure and function of the head system 100 will be described later.

The frames 100*a* support the four head systems 100 such that a front-rear direction (described later) of each of the four head systems 100 coincides with the conveyance direction of the printer 1000 and such that nozzle surfaces 40*n* (described later) of the four head systems 100 face an upper surface of the platen 200.

The platen 200 is a plate-shaped member configured to support the medium PM from a side (lower side) opposite to the head system 100 in a case where ink, which is an example of "liquid", is discharged from the head system 100 toward the medium PM.

The conveyance rollers 301 and 302 have the platen 200 sandwiched in between in the conveyance direction. The conveyance rollers 301 and 302 is configured to function as a conveyance device configured to convey the medium PM in the conveyance direction in a prescribed form, in a case where the head system 100 forms an image on the medium PM.

The ink tank 400, which is an example of a "storage tank", is divided into four main tanks 410, in order to store ink of four colors. Each of the four main tanks 410 is connected to a corresponding one of the four head systems 100, via the HPM 500.

One HPM 500 connects one main tank 410 and one head system 100, and a total of four HPMS 500 are provided. A specific structure and function of the HPM 500 will be described later.

In the present embodiment, four different types of ink are stored in the respective four main tanks 410, and each of the four head systems 100 are configured to discharge a respective one of the four different types of ink. The four types of ink are, for example, cyan ink, magenta ink, yellow ink, and black ink.

The air pressure regulator 600 is a mechanism configured to regulate pressure in a sub-tank 20 (described later) of the head system 100, and an example thereof is a pump. One air pressure regulator 600 is provided for one head system 100, and a total of four air pressure regulators 600 are provided. FIG. 1 typically shows only one air pressure regulator 600.

The controller 700 is configured to collectively control units of the printer 1000 to cause the units to perform image formation on the medium PM or the like. The controller 700 includes a field programmable gate array (FPGA), an electrically erasable programmable read-only memory (EEPROM), a random access memory (RAM), and the like. The controller 700 may include a central processing unit (CPU), an application specific integrated circuit (ASIC), or the like. The controller 700 is connected to an external device (not shown) such as a PC to perform data communication. The controller 700 is configured to control units of the printer 1000, based on print data sent from the external device.

The display unit 900 is a device configured to visually present information to a user. Specifically, the display unit 900 is a liquid crystal monitor or the like.

<Head System 100>

Figure 2:
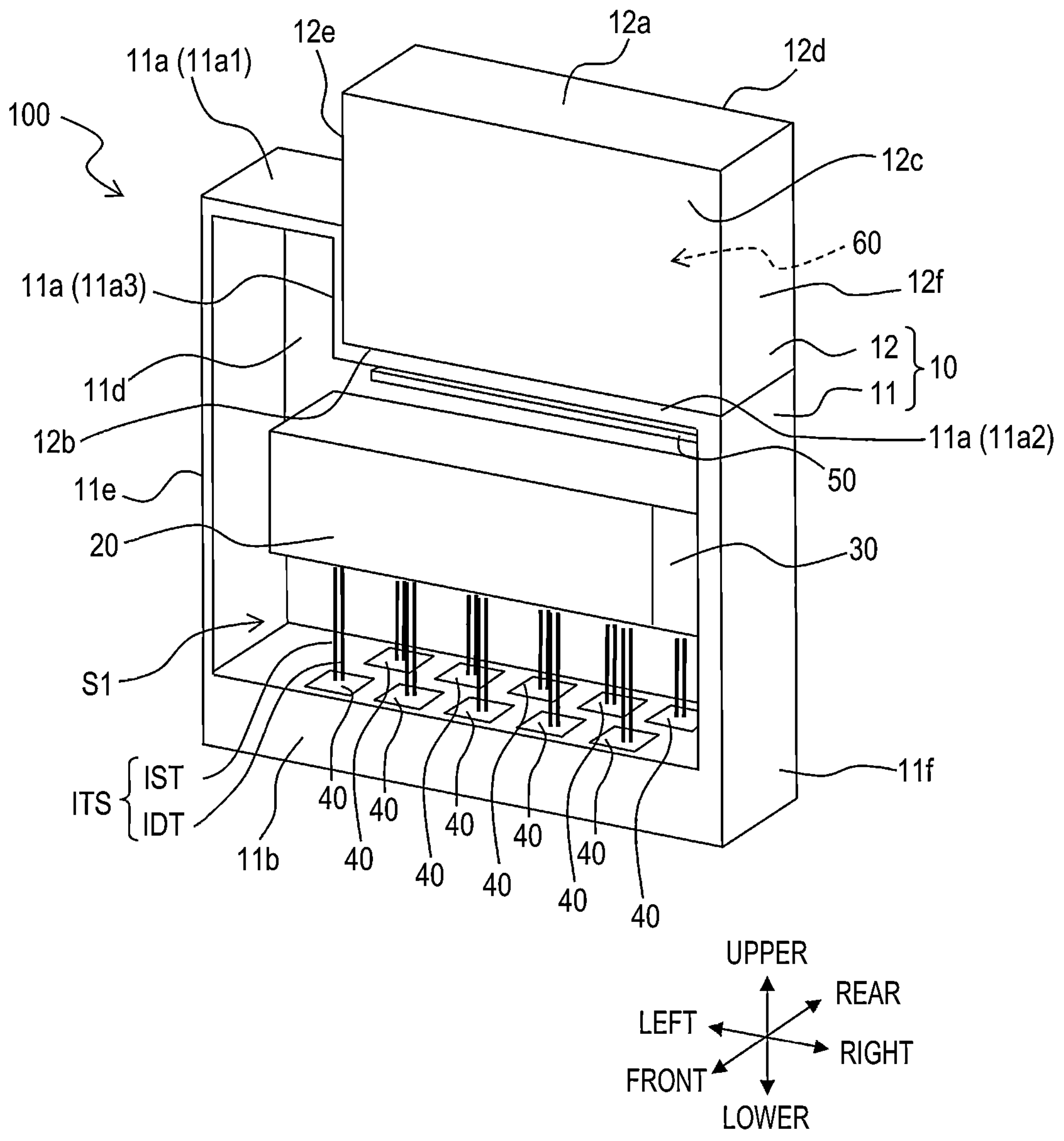
FIG. 2 is a perspective view of a head system.

As shown in FIG. 2, each of the four head systems 100 mainly includes a case 10, the sub-tank 20, a liquid surface detector 30, ten head mechanisms 40 arranged in a zigzag pattern, a relay board 50, and a control board unit 60. The four head systems 100 have the same configuration, and thus one of the four head systems 100 will be described below.

In the following description, a direction in which the ten head mechanisms 40 are arranged in a zigzag pattern is referred to as a width direction of the head system 100, and a direction in which the ten head mechanisms 40 and the sub-tank 20 are arranged is referred to as an upper-lower direction. A direction perpendicular to the width direction and the upper-lower direction is referred to as a front-rear direction of the head system 100.

In the front-rear direction, a paper front side and a back side in FIG. 2 are referred to as a front side and a rear side in the front-rear direction, respectively. In the width direction, a left side and a right side when viewed from the front side in the front-rear direction are a left side and a right side in the width direction, respectively. In the upper-lower direction, a side on which the sub-tank 20 is located relative to the ten head mechanisms 40 is referred to as an upper side, and an opposite side is referred to as a lower side.

When the head system 100 is mounted on the printer 1000, the width direction of the head system 100 coincides with the medium width direction of the printer 1000, and the front-rear direction of the head system 100 coincides with the conveyance direction of the printer 1000.

<Case 10>

The case 10 may be formed of, for example, metal. The case 10 includes a first case 11 and a second case 12 that is configured to be attached to and detached from the first case 11.

The first case 11 includes a top plate 11*a*, a bottom portion 11*b*, a front wall (not shown in FIG. 2 to show an inside of the first case 11), a rear wall 11*d*, a left wall 11*e*, and a right wall 11*f*. A space SI surrounded by the top plate 11*a*, the bottom portion 11*b*, the front wall, the rear wall 11*d*, the left wall 11*e*, and the right wall 11*f* is defined inside the first case 11.

The top plate 11*a* includes a first region 11*a*1, a second region 11*a*2 located on a right side of the first region 11*al*, and a vertical region 11*a*3 between the first region 11*al* and the second region 11*a*2. The first region 11*al* is located above the second region 11*a*2.

Figure 3:
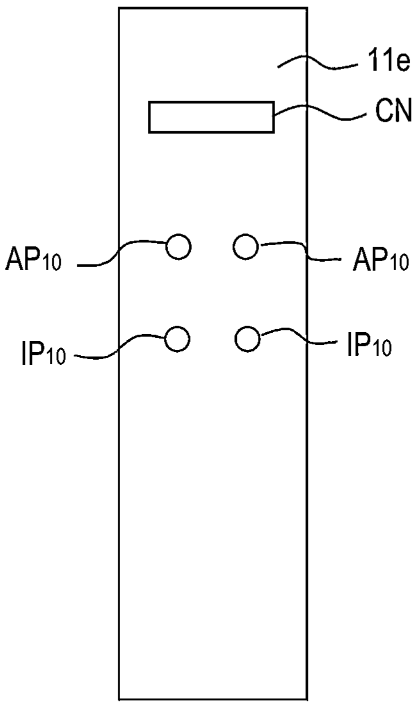
FIG. 3 is a side view of a case of the head system.

As shown in FIG. 3, the left wall 11*e* is provided with a power connector CN on an upper portion, and two air vents AP10 arranged in the front-rear direction below the power connector CN. Below the two air vents AP10, two ink vents IP10 are arranged in the front-rear direction. None of the power connector CN, the two air vents AP10, and the two ink vents IP10 are shown in FIG. 2.

As shown in FIG. 2, the second case 12 includes a top plate 12*a*, a bottom plate 12*b*, a front wall 12*c*, a rear wall 12*d*, a left wall 12*e*, and a right wall 12*f*. In a state where the second case 12 is attached to the first case 11, the bottom plate 12*b* of the second case 12 comes into contact with the second region 11*a*2 of the top plate 11*a* of the first case 11.

<Sub-Tank 20>

The sub-tank 20 is configured to receive and store ink supplied to the head system 100. The ink stored in the sub-tank 20 is distributed to each of the plurality of head mechanisms 40.

As shown in FIG. 2, the sub-tank 20 has an elongated shape, and is disposed in the space SI such that a longitudinal direction thereof coincides with the width direction of the head system 100.

Figure 4:
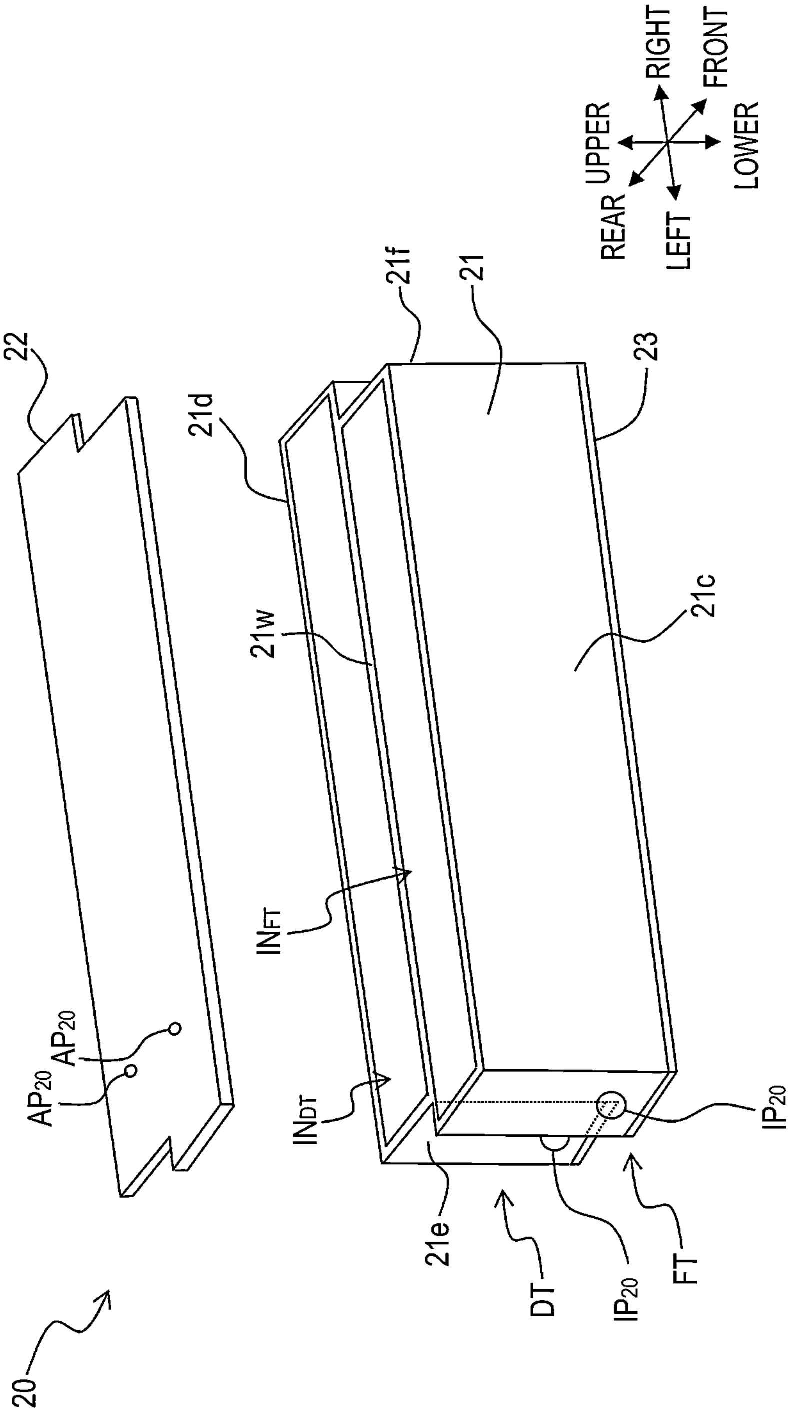
FIG. 4 is an exploded perspective view of a sub-tank.
Figure 5:
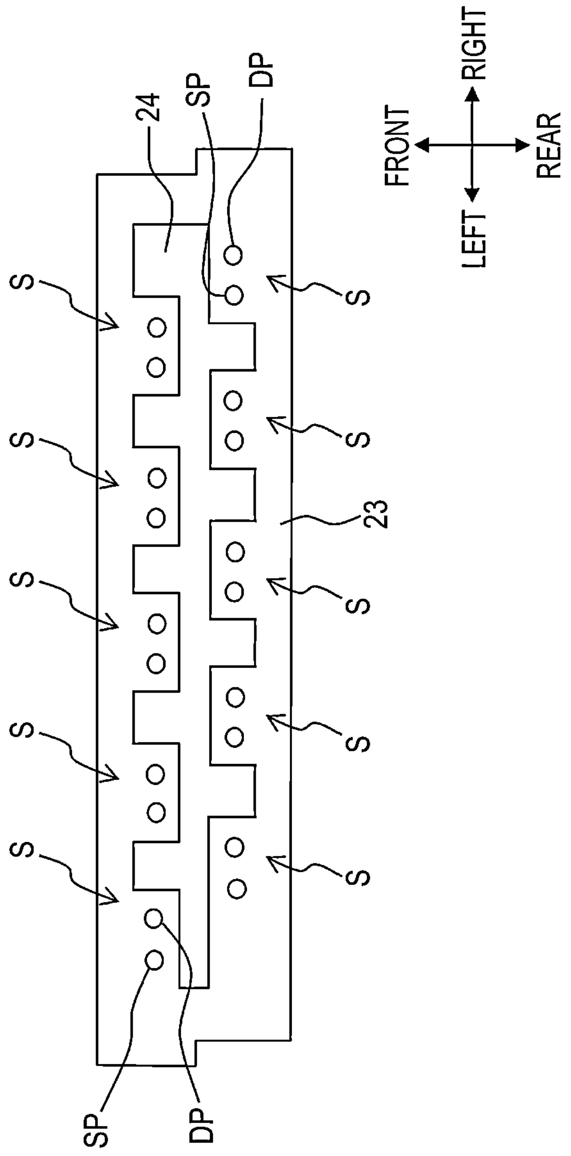
FIG. 5 is a bottom view of the sub-tank.

As shown in FIGS. 4 and 5, the sub-tank 20 includes a body 21, a top plate 22, and a bottom plate 23. A heater 24 (FIG. 5) adheres to a lower surface of the bottom plate 23.

The body 21 is formed of a resin as an example. The body 21 includes a front wall 21*c* and a rear wall 21*d* extending along a plane perpendicular to the front-rear direction of the head system 100, and a left wall 21*e* and a right wall 21*f* extending along a plane perpendicular to the width direction of the head system 100. The body 21 includes a separation wall 21*w* inside, which is parallel to the front wall 21*c* and the rear wall 21*d*.

The top plate 22 is, for example, a flat plate made of metal. A shape of the top plate 22 in plan view is the same as a shape of an outline of the body 21 viewed from above. The top plate 22 is fixed to an upper end portion of the body 21 with a sealing rubber (not shown) sandwiched in between.

The bottom plate 23 is a flat plate made of metal. A shape of the bottom plate 23 in plan view is the same as the shape of the outline of the body 21 as viewed from above. The bottom plate 23 is fixed to a lower end portion of the body 21 with a sealing rubber (not shown) sandwiched in between.

As shown in FIG. 4, the sub-tank 20 includes a fill tank FT, which is an example of a "supply tank", including the front wall 21*c*, the separation wall 21*w*, the left wall 21*e*, and the right wall 21*f* of the body 21, the top plate 22, and the bottom plate 23. The sub-tank 20 further includes a drain tank DT, which is an example of a "discharge tank", including the rear wall 21*d*, the separation wall 21*w*, the left wall 21*e*, and the right wall 21*f* of the body 21, the top plate 22, and the bottom plate 23. An internal space INFT of the fill tank FT and an internal space INDT of the drain tank DT are closed spaces, and are separated from each other.

The left wall 21*e* is formed with two ink vents IP20 arranged in the front-rear direction. The front ink vent IP20 communicates with the internal space INFT of the fill tank FT. The rear ink vent IP20 communicates with the internal space INDT of the drain tank DT.

Figure 10:
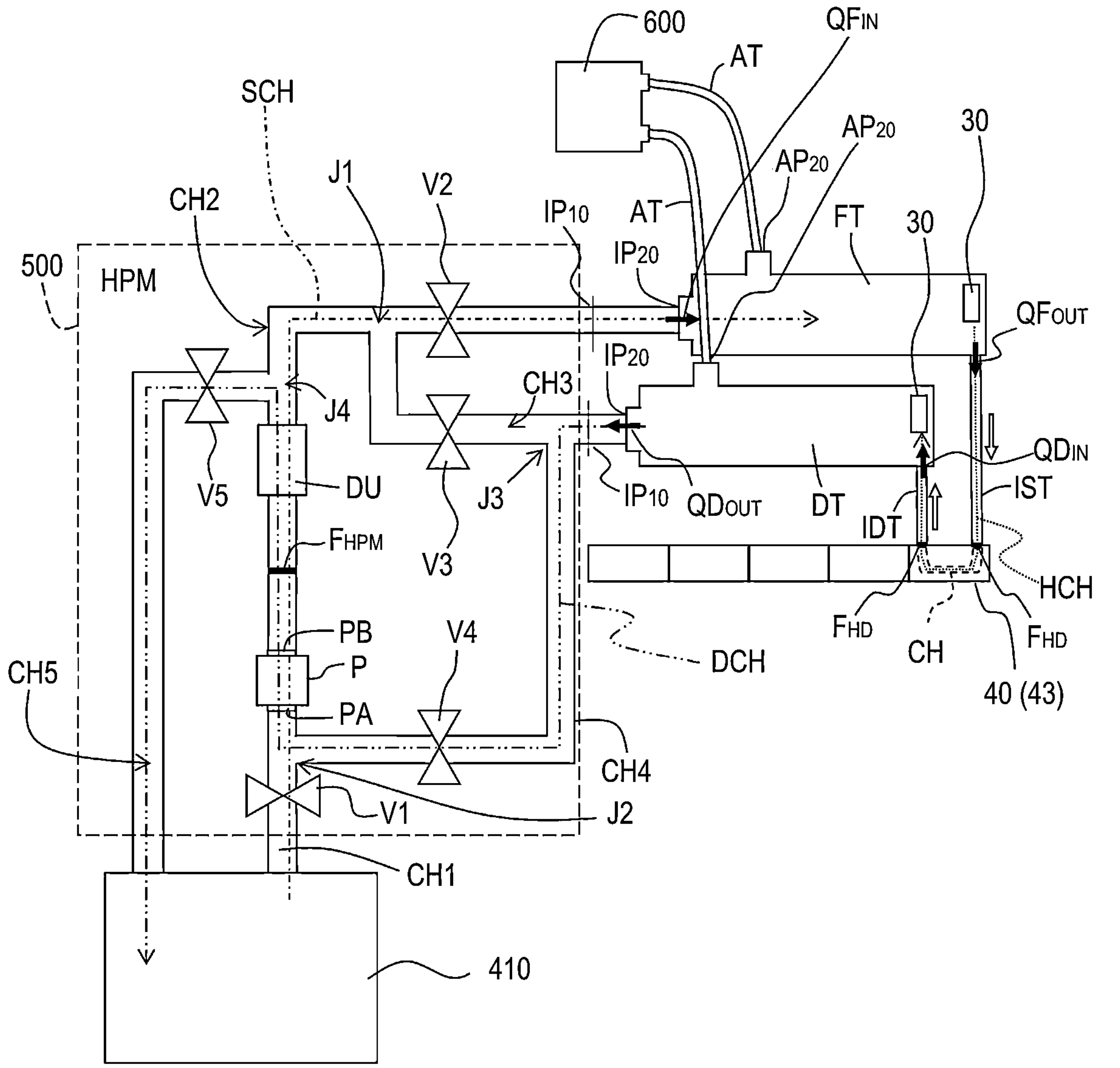
FIG. 10 is a schematic diagram showing a channel configuration of a hydraulic pneumatics module (HPM).

The top plate 22 is formed with two air vents AP20 arranged in the front-rear direction. The front air vent AP20 communicates with the internal space INFT of the fill tank FT. The rear air vent AP20 communicates with the internal space INDT of the drain tank DT. Further, as shown in FIG. 10, each of the two air vents AP20 is connected, by a conduit AT, to the air pressure regulator 600, through the air vent AP10 on the rear side of the case 10.

Ten ink vent sets S are provided on the lower surface of the bottom plate 23, as shown in FIG. 5. Each of the ink vent sets S includes one ink inlet SP and one ink outlet DP. The ten ink vent sets S are arranged in a zigzag pattern along the width direction of the head system 100. In each ink vent set S, the ink inlet SP and the ink outlet DP are arranged in the width direction.

Through a channel (not shown) formed in a lower portion inside the body 21, the internal space INFT of the fill tank FT communicates with the ink inlet SP of each ink vent set S, and the internal space INDT of the drain tank DT communicates with the ink outlet DP of each ink vent set S.

<Liquid Surface Detector 30>

Figure 6:
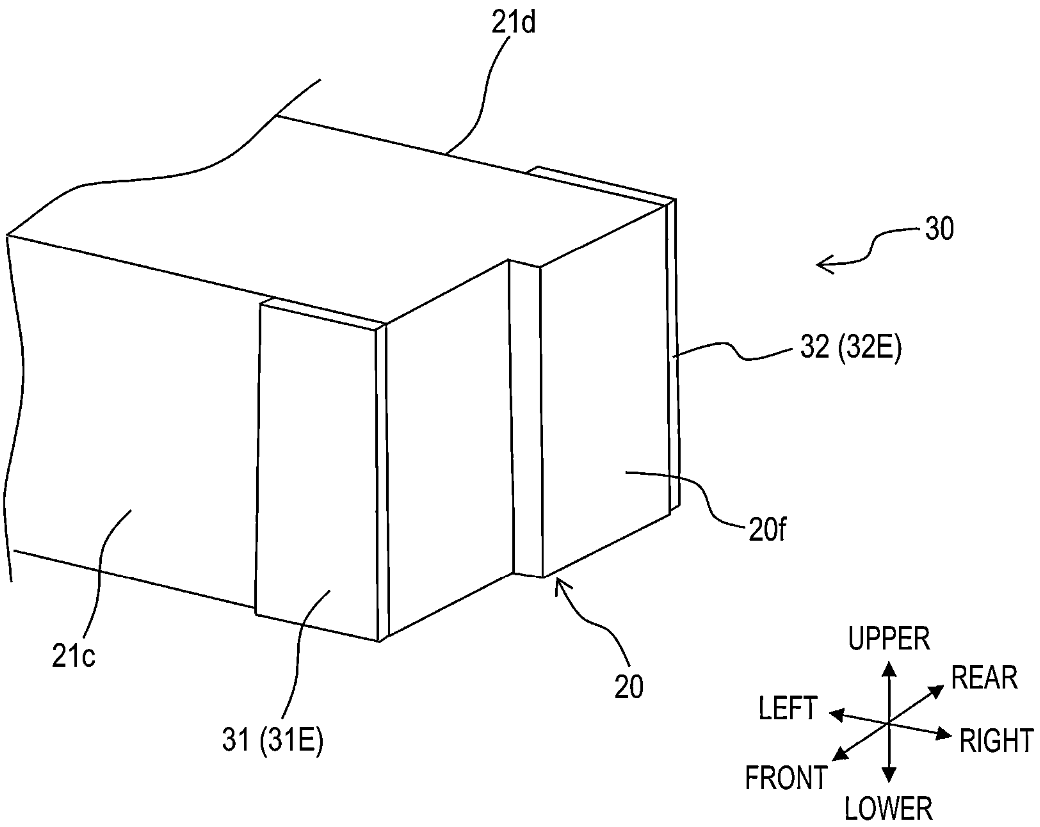
FIG. 6 is a perspective view of a vicinity of a right end portion of the sub-tank and a liquid surface detector attached to the sub-tank.

As shown in FIG. 6, the liquid surface detector 30 includes a fill tank sensor 31, which is an example of a "first liquid amount sensor", configured to detect a position of a liquid surface of ink stored in the fill tank FT, and a drain tank sensor 32, which is an example of a "second liquid amount sensor", configured to detect a position of a liquid surface of ink stored in the drain tank DT.

The fill tank sensor 31 and the drain tank sensor 32 are known static capacitive liquid surface sensors. The fill tank sensor 31 mainly includes a flat plate-shaped detection electrode 31E attached to the front wall 21*c* in a vicinity of a right end portion of the sub-tank 20. The drain tank sensor 32 mainly includes a flat plate-shaped detection electrode 32E attached to the rear wall 21*d* in a vicinity of the right end portion of the sub-tank 20.

The fill tank sensor 31, the detection electrode 31E, and a grounded metal surface in a vicinity of the detection electrode 31E configure a pseudo condenser. The grounded metal surface may be, for example, a metal plate that the fill tank sensor 31 includes, or may be the top plate 22, the bottom plate 23, or the like of the sub-tank 20. Similarly, the drain tank sensor 32, the detection electrode 32E, and a grounded metal surface in a vicinity of the detection electrode 32E configure a pseudo condenser. The grounded metal surface may be, for example, a metal plate that the drain tank sensor 32 includes, or may be the top plate 22, the bottom plate 23, or the like of the sub-tank 20.

In the fill tank sensor 31 and the drain tank sensor 32, a static capacitance value of a pseudo condenser changes according to a position of a liquid surface in the internal space INFT and a position of a liquid surface in the internal space INDT. Each of the fill tank sensor 31 and the drain tank sensor 32 is configured to output, to the controller 700, the static capacitance value of a pseudo condenser.

<Head Mechanism 40>

Figure 7:
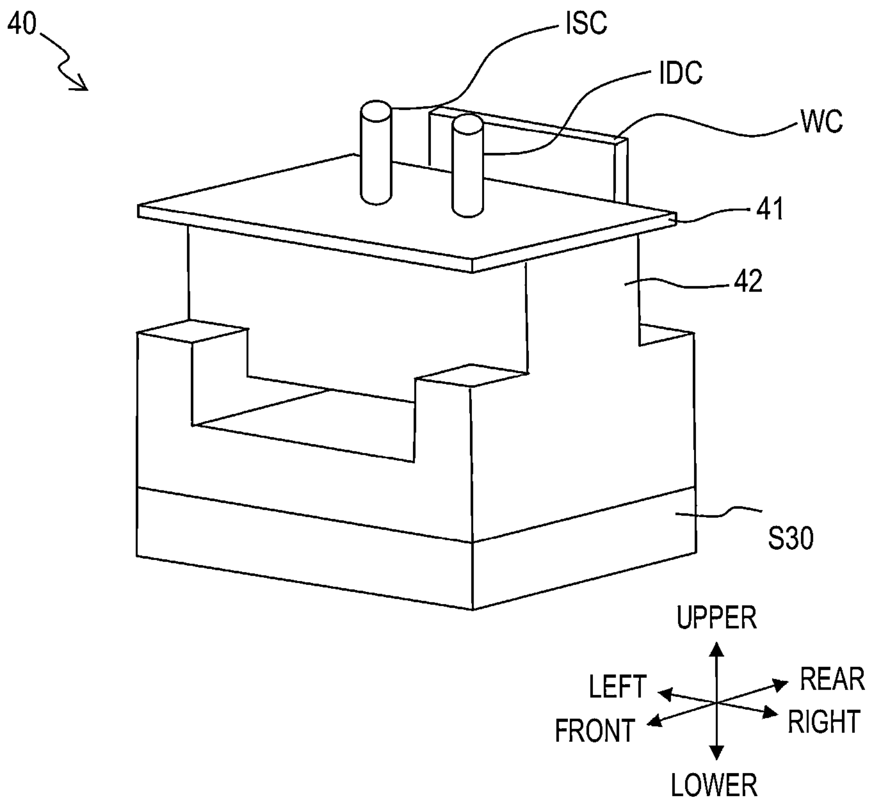
FIG. 7 is a perspective view of a head mechanism.

As shown in FIG. 7, each of the ten head mechanisms 40 having the same configuration and including a connection plate 41, a body 42, and a head 43 in order from top. The head mechanism 40 further includes a wiring connection portion WC extending in the upper-lower direction between above the connection plate 41 and the head 43.

The connection plate 41 is provided with an ink supply tube connection portion ISC and an ink discharge tube connection portion IDC.

The body 42 is fixed to a lower surface of the connection plate 41. The body 42 includes, inside of the body 42, a channel for supplying ink supplied to the ink supply tube connection portion ISC to the head 43, and a channel for returning ink not extruded from the head 43 to the ink discharge tube connection portion IDS.

Figure 8:
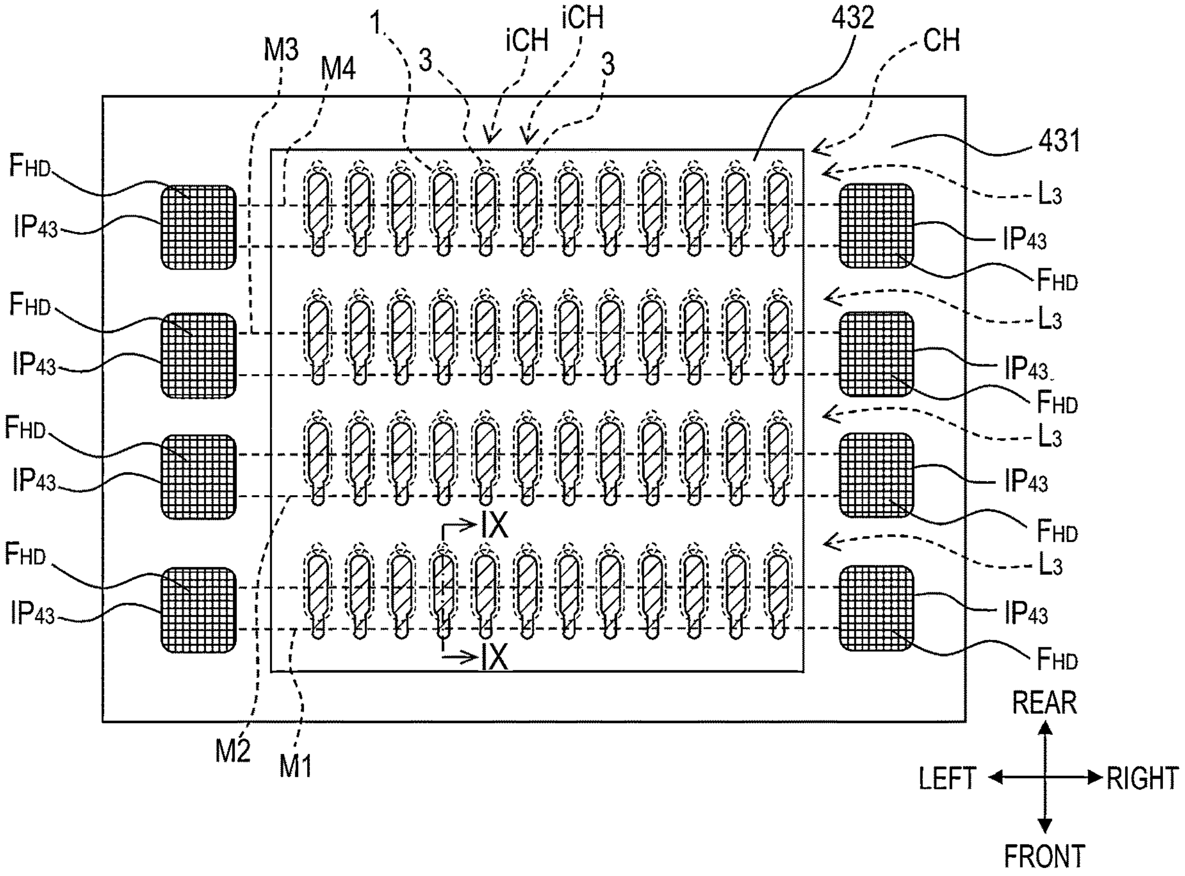
FIG. 8 is a plan view of a head.
Figure 9:
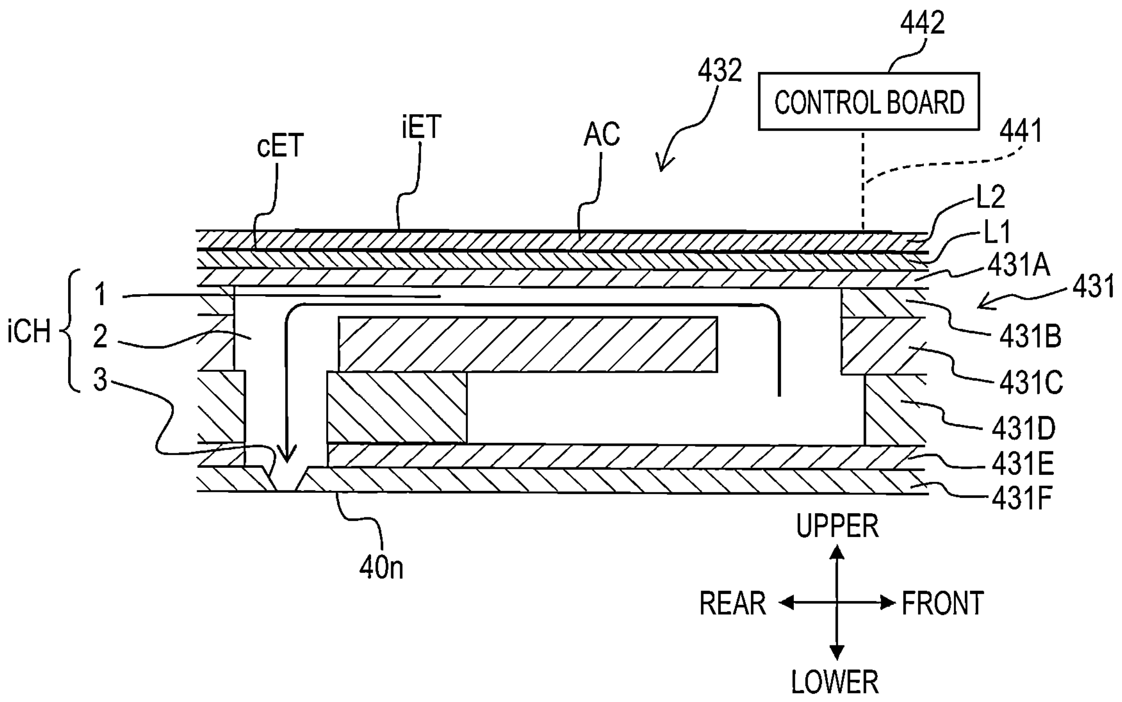
FIG. 9 is a cross-sectional view taken along a line IX-IX in FIG. 8.

The head 43 is fixed to a lower surface of the body 42. As shown in FIGS. 8 and 9, the head 43 includes a channel unit 431 and a piezoelectric actuator 432.

As shown in FIG. 9, the channel unit 431 is a laminated structure in which an ink sealing film 431A, plates 431B to 431E, and a nozzle plate 431F are laminated in this order from top. As shown in FIG. 8, a channel CH is formed inside the channel unit 431.

The channel CH includes eight ink vents IP43, four manifold channels M1, M2, M3, and M4, and 48 individual channels iCH. Each of the four manifold channels M1 to M4 is a linear channel, and communicates with the ink vents IP43 at two end portions. Each of the four manifold channels M1 to M4 is connected to 12 individual channels iCH.

A head filter FHD, which is an example of a "first filter", is located in each of the eight ink vents IP43. The head filter FHD is configured to remove foreign matter and bubbles mixed in ink.

As shown in FIG. 9, each individual channel iCH includes a pressure chamber 1, a descender channel 2, and a nozzle 3. An upper surface of the pressure chamber 1 is configured by the ink sealing film 431A. The descender channel 2 extends, in the upper-lower direction, from the pressure chamber 1 toward the nozzle 3. The nozzle 3 is a minute opening for extruding ink toward the medium PM, and is formed in the nozzle plate 431F. A lower surface of the nozzle plate 431F is a lower surface of the head mechanism 40 and is the nozzle surface 40*n*. The nozzle surface 40*n* is formed with nozzle arrays L3, which is shown in FIG. 8, along directions in which the manifold channels M1 to M4 extend.

As shown in FIG. 9, the piezoelectric actuator 432 includes a first piezoelectric layer L1 provided on an upper surface of the channel unit 431, a second piezoelectric layer L2 above the first piezoelectric layer L1, a common electrode cET sandwiched between the first piezoelectric layer L1 and the second piezoelectric layer L2, and a plurality of individual electrodes iET provided on an upper surface of the second piezoelectric layer L2. The plurality of individual electrodes iET are provided on the upper surface of the second piezoelectric layer L2 such that the plurality of individual electrodes iET are located above the respective pressure chambers 1 of the plurality of individual channels iCH. A portion of the second piezoelectric layer L2 is an active portion AC polarized in a thickness direction, the portion being sandwiched between the common electrode cET and each of the plurality of individual electrodes iET.

Each of the individual electrodes iET of the piezoelectric actuator 432 is connected to a control board 442 on which a driver IC is mounted, via a flexible printed circuit (FPC) 441. The control board 442 is disposed inside the body 42.

The wiring connection portion WC has a board shape. An upper end portion of the wiring connection portion WC protrudes above the connection plate 41. The wiring connection portion WC is connected to the relay board 50 (described later), via a flexible substrate (not shown). A lower end portion of the wiring connection portion WC is connected to the control board 442.

Each of the head mechanisms 40 is fixed to the bottom portion 11*b* of the first case 11, as shown in FIG. 2. In this state, the nozzle surface 40*n* of each head mechanism 40 is exposed to a lower side of the case 10. The nozzle arrays L3 of the nozzle surfaces 40*n* extend along the width direction of the head system 100. The ten head mechanisms 40 are disposed in a zigzag manner along the width direction.

Each of the head mechanisms 40 and the sub-tank 20 are connected by an ink tube set ITS, as shown in FIG. 2. The ink tube set ITS includes one ink supply tube IST and one ink discharge tube IDT.

An upper end of the ink supply tube IST is connected to the ink inlet SP of the corresponding ink vent set S of the sub-tank 20. A lower end of the ink supply tube IST is connected to the ink supply tube connection portion ISC of the head mechanism 40. An upper end of the ink discharge tube IDT is connected to the ink outlet DP of the corresponding ink vent set S of the sub-tank 20. A lower end of the ink discharge tube IDT is connected to the ink discharge tube connection portion IDC of the head mechanism 40.

Ink supplied from the sub-tank 20 to the ink supply tube connection portion ISC through the ink supply tube IST branches in the body 42 and flows into the ink vents IP43 of the head 43.

Channels of the body 42 are configured such that the ink supplied to the ink supply tube connection portion ISC flows through the manifolds M1 to M4 and the ink discharged from the manifolds M1 to M4 flows to the ink discharge tube connection portion IDC. The ink may flow in the same direction in all of the manifolds M1 to M4, and the flow direction of the ink in the manifolds M1 and M3 may be opposite to the flow direction of the ink in the manifolds M2 and M4.

<Relay Board 50>

The relay board 50 mainly relays the control board unit 60 (described later) and the control board 442 of the head mechanism 40. The relay board 50 is connected to the wiring connection portion WC of each of the ten head mechanisms 40, via a flexible board (not shown).

The relay board 50 is connected to an electrical connector CN of the case 10 via wiring (not shown), and is configured to distribute power supplied from the electrical connector CN to the control board unit 60 and the like.

As shown in FIG. 2, the relay board 50 is attached, in parallel with the second region 11*a*2, to a lower surface of the second region 11*a*2 of the top plate 11*a*. That is, an installation surface of the relay board 50 is parallel to upper and lower surfaces of the second region 11*a*2 and parallel to a surface along the width direction and the front-rear direction.

<Control Board Unit 60>

The control board unit 60 is configured to receive a print data signal from the controller 700 of the printer 1000, and configured to send the print data signal to the control board 442 of each head mechanism 40, via the relay board 50. The control board unit 60 is provided inside the second case 12 of the case 10, as shown in FIG. 2.

A terminal (not shown) of the control board unit 60 protrudes downward through an opening (not shown) provided in the bottom plate 12*b* of the second case 12. The terminal is configured to be attached to and detached from a connector (not shown) of the relay board 50 through an opening (not shown) provided in the second region 11*a*2 of the top plate 11*a* of the first case 11, to attach the second case 12 to the first case 11 and to detach the second case 12 from the first case 11.

<HPM 500>

As shown in FIG. 1, each of the four HPMS 500 connects one of the four main tanks 410 of the ink tank 400 and a corresponding one of the four head systems 100. The four HPMS 500 have the same configuration, and thus one of the four HPMS 500 will be described below.

As shown in FIG. 10, the HPM 500 mainly includes a pump P, a deaeration unit DU, five channels (channels CH1 to CH5), five valves (valves V1 to V5), and a HPM filter FHPM, which is an example of a "second filter".

The channel CH1 connects the main tank 410 and a suction port PA of the pump P. The channel CH2 connects an outlet PB of the pump P and the fill tank FT, through the ink vent IP10 on the front side of the case 10 and the ink vent IP20 on the front side of the sub-tank 20. The channel CH3 connects the channel CH2 and the drain tank DT, through the ink vent IP10 on the rear side of the case 10 and the ink vent IP20 on the rear side of the sub-tank 20. The channel CH4 connects the channel CH1 and the channel CH3. The channel CH5 connects the channel CH2 and the main tank 410.

The channel CH3 is connected to the channel CH2, at a branch J1 of the channel CH2. The channel CH4 is connected to the channel CH1, at a branch J2 of the channel CH1. The channel CH4 is connected to the channel CH3, at a branch J3 of the channel CH3. The channel CH5 is connected to the channel CH2, at a branch J4 of the channel CH2.

The valve V1 is located between the main tank 410 and the branch J2 in the channel CH1. The valve V2 is located between the branch J1 and the fill tank FT in the channel CH2. The valve V3 is located between the branch J1 and the branch J3 in the channel CH3. The valve V4 is located in the channel CH4. The valve V5 is located in the channel CH5. The valves V1 to V5 is configured to open and close the channels CH1 to CH5, respectively.

The deaeration unit DU is located between the pump P and the branch J4 in the channel CH2. In the present embodiment, the deaeration unit DU is a known deaeration module, and is configured to remove gas such as air contained in the ink passing through the deaeration unit DU.

The HPM filter FHPM is located between the pump P and the deaeration unit DU in the channel CH2.

In the following description, a channel from the main tank 410 to the fill tank FT through the channel CH1 and the channel CH2 is referred to as a supply channel SCH. A channel from the drain tank DT to the main tank 410 through the channel CH3, the branch J3, the channel CH4, the branch J2, the channel CH1, the channel CH2, the branch J4, and the channel CH5, is referred to as a discharge channel DCH. A channel from the fill tank FT to the drain tank DT through the ink supply tube IST, the channel CH of the head 43, and the ink discharge tube IDT is referred to as a head channel HCH. The HPM filter FHPM is located in the supply channel SCH and the discharge channel DCH. The head filter FHD is located in the head channel HCH.

<Printing Method>

Image formation on the medium PM by the printer 1000 is performed as follows by controlling units of the printer 1000 by the controller 700.

The controller 700 is configured to control the HPM 500 and the air pressure regulator 600 to feed ink in the main tank 410 to the head system 100. For example, the controller 700 is configured to drive the pump P in a state where the first valve V1 and the second valve V2 of the HPM 500 are opened and the third valve V3 to the fifth valve V5 are closed, to feed the ink in the main tank 410 to the fill tank FT through the supply channel SCH.

The air pressure regulator 600 is configured to regulate air pressure of an air layer, which is a region above the liquid surface of ink in which air is present, in the internal space INFT of the fill tank FT to be higher than air pressure of an air layer in the internal space INDT of the drain tank DT. Thus, the ink in the fill tank FT is fed to the head channel HCH. The ink fed from the fill tank FT to the head channel HCH is fed to the channel CH of the head 43 through the ink supply tube IST. The ink not discharged from the nozzle 3 in the head 43 is fed to the drain tank DT through the ink discharge tube IDT.

In a case where discharging ink from the drain tank DT, the controller 700 is configured to drive the pump P in a state where, for example, the fourth valve V4 and the fifth valve V5 are opened and the first valve V1 to the third valve V3 are closed. Thus, the ink in the drain tank DT is returned to the main tank 410 through the discharge channel DCH.

In parallel with the ink supply, the controller 700 is configured to send, to the control board unit 60, print data corresponding to an image to be formed. The control board unit 60 is configured to send print data to the control board 442 of each head mechanism 40, via the relay board 50 and a flexible board (not shown). The control board 442 of each head mechanism 40 is configured to drive a respective one of the plurality of piezoelectric actuators 432 at an appropriate timing based on the print data, and is configured to discharge ink from the nozzle 3 at an appropriate timing.

The controller 700 is configured to alternately perform ink discharge and conveyance of the medium PM using the conveyance rollers 301 and 302, to form an image corresponding to the print data on the medium PM.

<Filter State Determination>

Filter state determination performed by the printer 1000 according to the present embodiment will be described. The filter state determination includes state determination of the head filter FHD and state determination of the HPM filter FHPM. The state determination of the head filter FHD and the state determination of the HPM filter FHPM may be performed at the same timing in turn or at different timings.

(1) State Determination of Head Filter FHD

Figure 11:
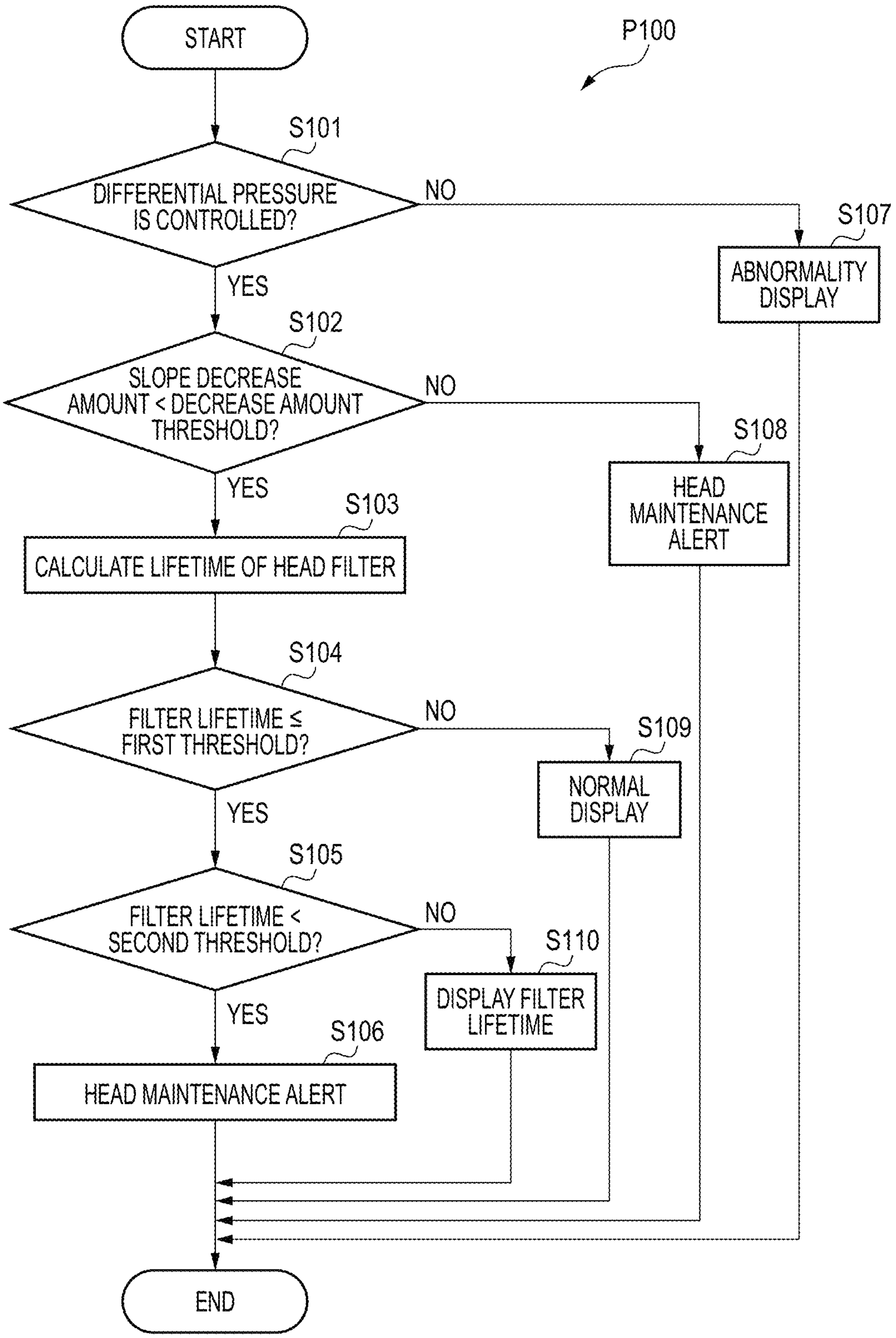
FIG. 11 is a flowchart showing a state determination process for determining a state of a head filter.

The state determination of the head filter FHD performed by the printer 1000 according to the present embodiment will be described. In the present embodiment, the controller 700 is configured to determine a state of the head filter FHD and configured to present information corresponding to a determination result to the user by executing a state determination process P100 (FIG. 11). The controller 700 is configured to executes the state determination process P100 periodically, for example, each day.

In the state determination process P100, the controller 700 uses, as a value indicating a flow rate of ink flowing through the head channel HCH, a slope (gradient) X of a detection value (static capacitance value) of the fill tank sensor 31 or a slope (gradient) Y of a detection value (static capacitance value) of the drain tank sensor 32. The slope X of the detection value of the fill tank sensor 31 is amount of change in the detection value of the fill tank sensor 31, which is a first liquid amount sensor, in a prescribed period, and is an example of a "first change amount". The slope Y of the detection value of the drain tank sensor 32 is amount of change in the detection value of the drain tank sensor 32, which is a second liquid amount sensor, in the prescribed period, and is an example of a "second change amount". A length of the prescribed period may be freely set. A reason why the slope X of the detection value of the fill tank sensor 31 or the slope Y of the detection value of the drain tank sensor 32 can be used as the value indicating the flow rate of the ink flowing through the head channel HCH is as follows.

Figure 12:
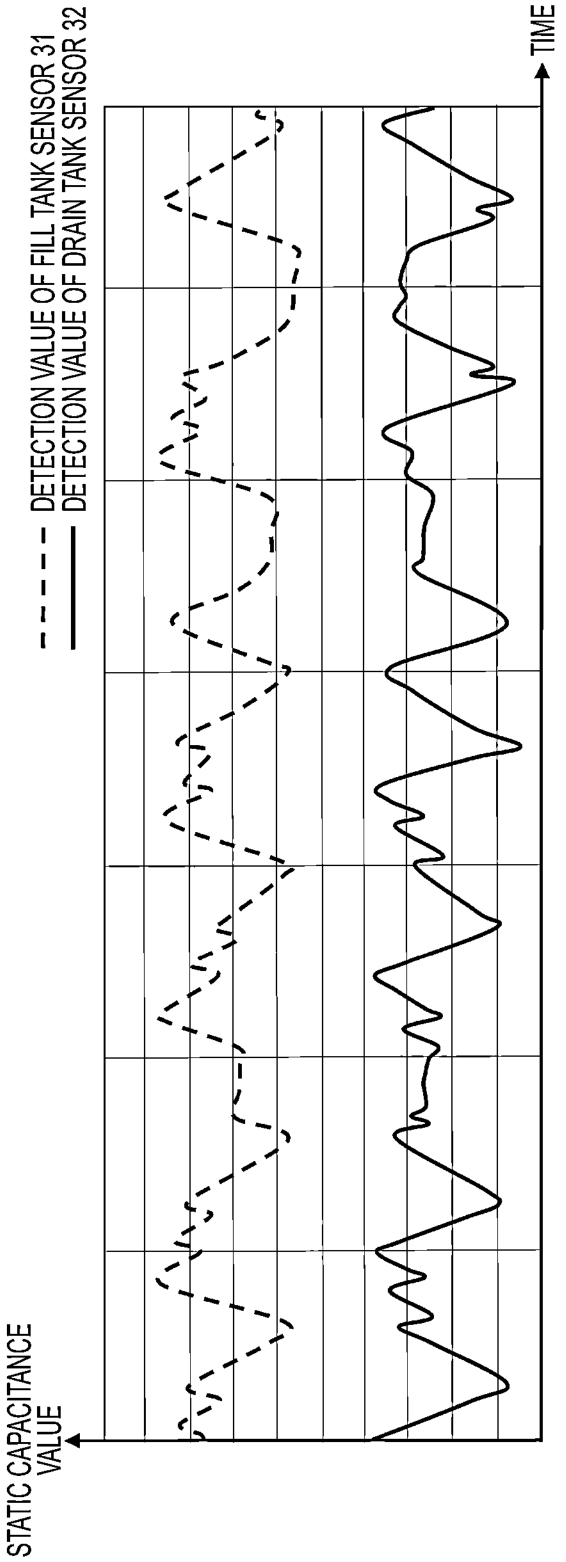
FIG. 12 is a graph showing temporal changes in detection values of a fill tank sensor and a drain tank sensor.

In FIG. 12, a solid line graph shows a temporal variation of the detection value (static capacitance value) of the fill tank sensor 31, and a broken line graph shows a temporal variation of the detection value (static capacitance value) of the drain tank sensor 32. In FIG. 12, a vertical axis represents a detection value (static capacitance value), and a horizontal axis represents time.

A dielectric constant of ink is generally higher than a dielectric constant of air. Accordingly, in a case where a storage amount of ink in the fill tank FT increases, the static capacitance value of the pseudo condenser constituted by the fill tank sensor 31 increases. That is, in a case where the liquid surface position rises, the detection value of the fill tank sensor 31 increases. On the contrary, in a case where the storage amount of ink in the fill tank FT decreases, the static capacitance value of the pseudo condenser configured by the fill tank sensor 31 decreases. That is, in a case where the liquid surface position lowers, the detection value of the fill tank sensor 31 decreases. The same applies to the detection value of the drain tank sensor 32.

Figure 13A:
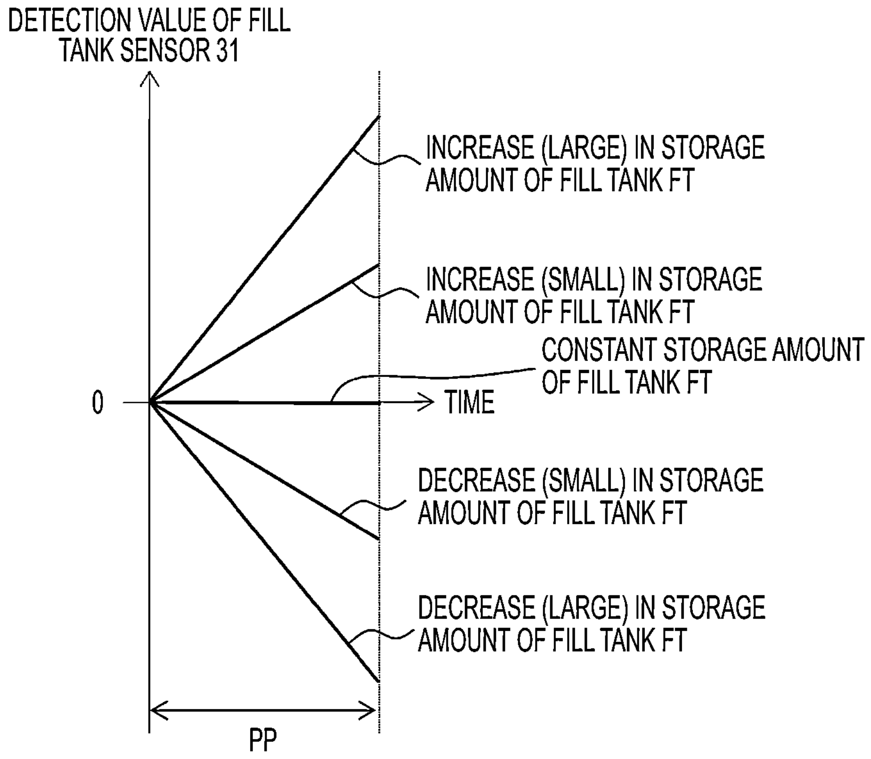
FIG. 13A is a graph showing a relationship between a change in an ink storage amount of the fill tank and a slope of a detection value of the fill tank sensor.

Accordingly, as shown in FIG. 13A, in a case where an increase in the storage amount of ink in the fill tank FT in a period PP is large, an increase in the detection value of the fill tank sensor 31 is also large. As a result, the slope X of the detection value of the fill tank sensor 31 increases. The period PP is an example of a "prescribed period", and may have a freely selected length. In a case where the increase in the storage amount of ink in the fill tank FT in the period PP is small, the slope X is also small. In a case where the increase in the storage amount of ink in the fill tank FT in the period PP is zero, the slope X is also zero. In a case where the storage amount of ink in the fill tank FT decreases during the period PP, the slope X is a negative value.

Figure 13B:
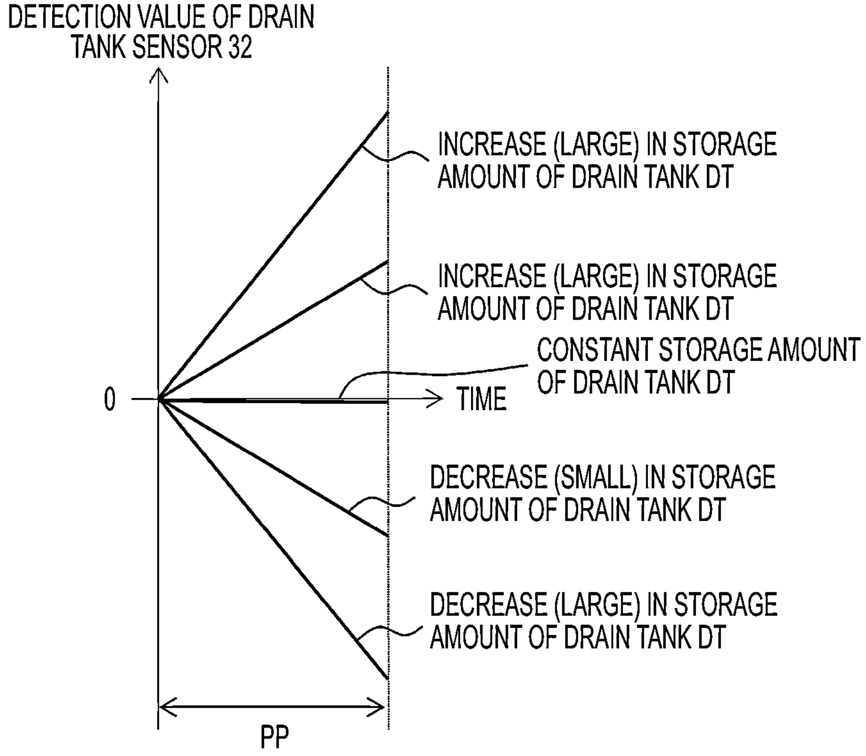
FIG. 13B is a graph showing the relationship between a change in an ink storage amount of the drain tank and a slope of a detection value of the drain tank sensor.

The same relationship also applies to the drain tank sensor 32. As shown in FIG. 13B, in a case where an increase in a storage amount of ink in the drain tank DT in the period PP is large, an increase in the detection value of the drain tank sensor 32 is also large. As a result, the slope Y of the detection value of the drain tank sensor 32 increases. In a case where the increase in the storage amount of ink in the drain tank DT in the period PP is small, the slope Y is also small. In a case where the increase in the storage amount of ink in the drain tank DT in the period PP is zero, the slope Y is also zero. In a case where the storage amount of ink in the drain tank DT decreases during the period PP, the slope Y is a negative value.

The following is a magnitude of the slope X in a case where ink is supplied from the fill tank FT to the drain tank DT through the head channel HCH in a state where supply of ink to the fill tank FT and discharge of ink from the head 43 are stopped. In this case, the slope X corresponds to an outflow amount of ink from the fill tank FT, that is, the flow rate of ink flowing through the head channel HCH. Similarly, the following is a magnitude of the slope Y in a case where ink is supplied from the fill tank FT to the drain tank DT through the head channel HCH in a state where discharge of ink to the drain tank DT and discharge of ink from the head 43 are stopped. In this case, the slope Y corresponds to an inflow amount of ink to the drain tank DT, that is, the flow rate of ink flowing through the head channel HCH.

In this way, the magnitudes of the slopes X and Y in prescribed states correspond to the flow rates of ink flowing through the head channel HCH. Thus, the controller 700 can use, as the value indicating the flow rate of the ink flowing through the head channel HCH, the slope X of the detection value of the fill tank sensor 31 or the slope Y of the detection value of the drain tank sensor 32.

Hereinafter, the state determination process P100 will be described with an example in which the slope Y of the detection value of the drain tank sensor 32 is used as the value indicating the flow rate of the ink flowing through the head channel HCH. The state determination process P100 can be executed in the same procedure as described below when the slope X of the detection value of the fill tank sensor 31 is used as the value indicating the flow rate of the ink flowing through the head channel HCH. To provide redundancy, the execution of the state determination process P100 using the slope X of the detection value of the fill tank sensor 31 and the execution of the state determination process P100 using the slope Y of the detection value of the drain tank sensor 32 may be executed in parallel or one after the other. In this case, one determination result can be used as a preliminary when a failure such as an error or an abnormal value occurs in the other determination result.

In step S101 of the state determination process P100 shown in FIG. 11, the controller 700 determines whether differential pressure PD between the fill tank FT and the drain tank DT is appropriately controlled.

The controller 700 determines whether the differential pressure PD is appropriately controlled, by the following procedure.

The controller 700 first controls the HPM 500 and the air pressure regulator 600 to feed ink in the main tank 410 to the drain tank DT, through the supply channel SCH and the head channel HCH. In this state, the controller 700 acquires the slope Y of the detection value of the drain tank sensor 32. Next, the controller 700 stops supplying ink from the supply channel SCH to the fill tank FT, and controls the air pressure regulator 600 to feed ink in the fill tank FT to the drain tank DT through the head channel HCH. In this state, the controller 700 acquires the slope Y of the detection value of the drain tank sensor 32. Thereafter, the controller 700 compares the slope Y acquired while feeding the ink in the main tank 410 to the drain tank DT with the slope Y acquired while feeding the ink in the fill tank FT to the drain tank DT, and determines that the differential pressure PD is appropriately controlled, in a case where the two values are equal. This is because, in a case where an amount of ink fed to the drain tank DT is the same, it is considered that the differential pressure PD is appropriately controlled, regardless of whether ink is supplied to the fill tank FT, that is, whether the liquid surface of the fill tank FT changes). On the other hand, in a case where the two values are different, the controller 700 determines that the differential pressure PD is not appropriately controlled.

The controller 700 may determine whether the differential pressure PD is appropriately controlled, based on a comparison between the slope X acquired while the ink in the fill tank FT is fed to the drain tank DT and the slope X acquired while the ink in the fill tank FT is fed to the main tank 410 through the head channel HCH and the discharge channel DCH. Also in this case, in a case where the two values are equal, the controller 700 determines that the differential pressure PD is appropriately controlled.

When determining that the differential pressure PD is not appropriately controlled (step S101: NO), the controller 700 causes the display unit 900 to display information indicating that an abnormality occurs in the control of the differential pressure PD (step S107), and ends the state determination process P100.

When determining that the differential pressure PD is appropriately controlled (step S101: YES), in step S102, the controller 700 determines whether a slope decrease amount, from execution of the previous state determination process P100, of the slope Y of the detection value of the drain tank sensor 32 is smaller than a decrease amount threshold THΔY. In a case where the slope decrease amount is smaller than the decrease amount threshold THΔY, it is considered that the slope Y of the detection value of the drain tank sensor 32 does not significantly decrease as compared with the previous state determination process P100. A significant decrease in the slope Y of the detection value of the drain tank sensor 32 in a short period may occur, for example, in a case where the head filter FHD captures a relatively large foreign matter.

First, the controller 700 calculates the slope decrease amount ΔY according to Equation (1), in which the slope Y of the detection value of the drain tank sensor 32 acquired during execution of the previous state determination process P100 is a slope Y0, and the slope Y of the detection value of the drain tank sensor 32 newly acquired in a current state determination process is a slope Y1. Here, the slope Y0 and the slope Y1 are acquired in a state where the slope Y0 and the slope Y1 correspond to the flow rate of ink flowing through the head channel HCH.

$$\Delta Y = Y0 - Y1 \qquad \text{Equation (1)}$$

Thereafter, the controller 700 compares the calculated slope decrease amount ΔY with the decrease amount threshold THΔY. In a case where the slope decrease amount ΔY is equal to or greater than the decrease amount threshold THΔY (S102: NO), the controller 700 advances the process to step S108 and executes a head maintenance alert, which is an example of a "notification related to the first filter". Specifically, the controller 700 displays information indicating that maintenance of the head 43, which is, for example, replacement of the head filter FHD, and replacement of the head 43, is necessary on the display unit 900. The head maintenance alert executed by the controller 700 in step S108 is based on a sudden decrease in the slope Y, that is, the flow rate of the ink flowing through the head channel HCH, and is considered to be urgent. For this reason, the controller 700 may display information prompting the user to immediately replace a component. Thereafter, the controller 700 ends the state determination process P100.

In a case where the slope decrease amount ΔY is smaller than the decrease amount threshold THΔY (S102: YES), the controller 700 advances the process to step S103. In step S103, the controller 700 calculates a lifetime, which is a remaining lifetime or remaining usable period, of the head filter FHD, based on the slope Y of the detection value of the drain tank sensor 32.

In the present embodiment, the controller 700 calculates the lifetime of the head filter FHD by the following procedure.

Figure 14A:
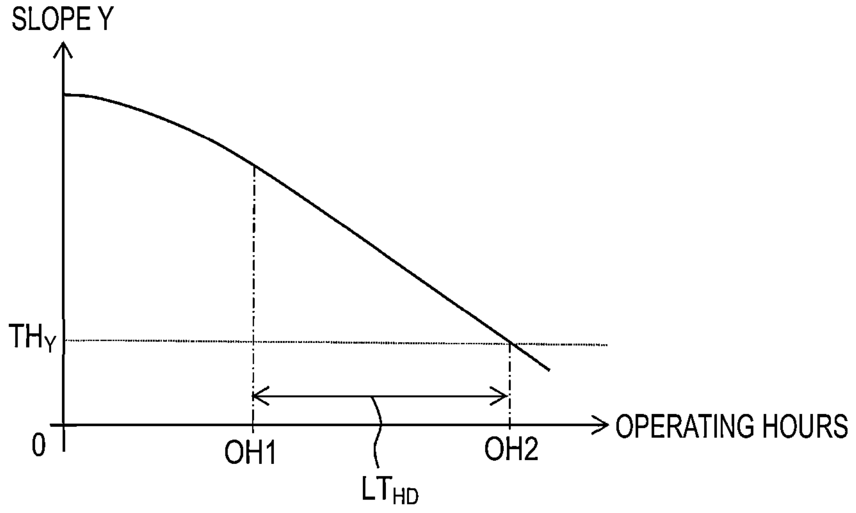
FIG. 14A is a graph showing a relationship between operating hours of the head filter and the slope of the detection value of the drain tank sensor.

As shown in FIG. 14A, the slope Y of the detection value of the drain tank sensor 32, which is acquired in a state where the slope Y corresponding to the flow rate of the ink flowing through the head channel HCH, decreases as operating hours of the printer 1000 increase, that is, operating hours of the head filter FHD increase. This is because the head filter FHD deteriorates or minute clogging accumulates due to use, and the amount of ink flowing through the head filter FHD decreases, in other words, the amount of ink flowing through the head channel HCH decreases. In a case where the slope Y of the detection value of the drain tank sensor 32 decreases to a threshold THY, it is considered that the head filter FHD is not suitable for use.

Here, assuming that current operating hours are operating hours OH1 and operating hours when the slope Y of the detector of the drain tank sensor 32 decreases to the threshold THY are operating hours OH2, a period from the operating hours OH1 to the operating hours OH2 corresponds to a lifetime LTHD of the head filter FHD.

Figure 14B:
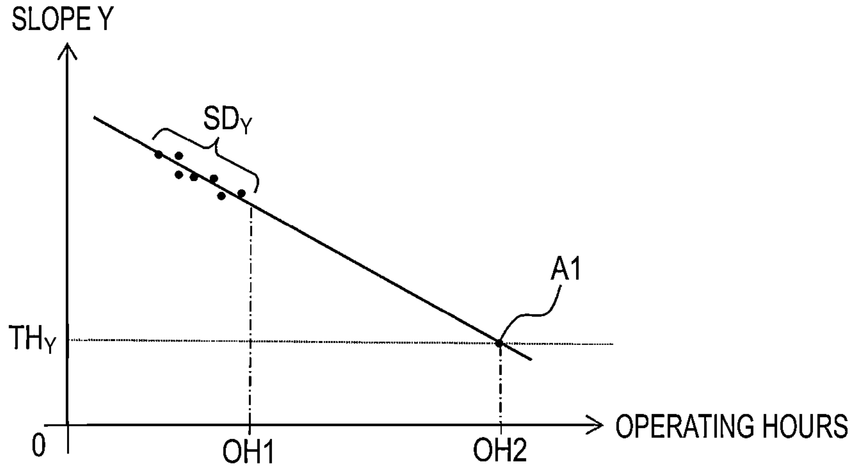
FIG. 14B is a schematic diagram showing an example of a method for calculating a lifetime of the head filter.

In view of the above, the controller 700 calculates the lifetime LTHD of the head filter FHD, based on time-series data SDY of the slope Y accumulated in the state determination process P100 executed so far, the slope Y being acquired in a state where the slope Y corresponds to the flow rate of the ink flowing through the head channel HCH. For example, the controller 700 is configured to obtain a slope of a temporal change of the slope Y, based on the time-series data SDY, to calculate the lifetime LTHD. Specifically, for example, as shown in FIG. 14B, the controller 700 is configured to obtain a straight line passing through the time-series data SD of the slope Y by using a linear approximation method such as the least squares method, and configured to obtain a point A1 at which the value of the slope Y indicated by the straight line matches the threshold THY. Then, the lifetime LTHD of the head filter FHD is calculated as a difference between the operating hours OH2 indicated by the point A1 and the current operable hours OH1.

After calculating the filter lifetime LTHD of the head filter FHD in step S103, the controller 700 determines, in step S104, whether the filter lifetime LTHD is equal to or less than a first threshold TH1HD, which is an example of a "first filter threshold". The first threshold TH1HD may be, for example, about several months to several years.

In a case where the filter lifetime LTHD is greater than the first threshold TH1HD (S104: NO), the controller 700 causes the display unit 900 to display information indicating that the state of the head filter FHD is normal (S109), and ends the state determination process P100. The information indicating that the state of the head filter FHD is normal may be, for example, text information or an icon that indicates "normal". The display indicating that the filter lifetime LTHD is greater than the first threshold TH1HD is also an example of the display of information indicating that the state of the head filter FHD is normal.

In a case where the filter lifetime LTHD is equal to or less than the first threshold TH1HD (S104: YES), the controller 700 determines whether the filter lifetime LTHD is less than a second threshold TH2HD (an example of a "first filter notification threshold"), in step S105. The second threshold TH2HD is a value smaller than the first threshold TH1HD, and may be about several days to several weeks as an example.

In a case where the filter lifetime LTHD is equal to or greater than the second threshold TH2HD (S105: NO), the controller 700 causes the display unit 900 to display the filter lifetime LTHD calculated in step S103 (S110), and ends the state determination process P100. In step S110, the controller 700 may cause the display unit 900 to display the filter lifetime LTHD as a lifetime of the head 42. In a case where the filter lifetime LTHD is smaller than the second threshold TH2HD (S105: YES), the controller 700 advances the process to step S106 and performs a head maintenance alert, which is an example of the "notification related to the first filter". Specifically, the controller 700 causes the display unit 900 to display information indicating that maintenance of the head 43, which is, for example, replacement of the head filter FHD, and replacement of the head 43, is necessary. The head maintenance alert performed by the controller 700 in step S106 is based on a predetermined gradual decrease in the slope Y (that is, the flow rate of the ink flowing through the head channel HCH), and it is considered not as urgent as the head maintenance alert performed in step S108. For this reason, the controller 700 may perform the display in a form different from that in step S108, and may display, for example, information prompting the user to execute replacement soon. Thereafter, the controller 700 ends the state determination process P100.

(2) State Determination of HPM Filter FHPM

State determination of the HPM filter FHPM performed by the printer 1000 according to the present embodiment will be described. The printer 1000 according to the present embodiment is configured to perform at least one of the state determination of the HPM filter FHPM based on a flow rate Q of the HPM filter FHPM and the state determination of the HPM filter FHPM based on a rotational speed of the pump P.

(2-1) State Determination Based on Flow Rate Q of HPM Filter FHPM

First, the state determination of the HPM filter FHPM based on the flow rate Q of the HPM filter FHPM will be described. The printer 1000 may be configured to determine the state of the HPM filter FHPM based on the flow rate Q of the HPM filter FHPM, in an embodiment in which, for example, the rotational speed of the pump P is not feedback-controlled and is constant regardless of the state of the HPM filter FHPM. In the present embodiment, the controller 700 is configured to determine the state of the HPM filter FHPM and is configured to present information corresponding to a determination result to the user by performing a state determination process P200 shown in a flowchart of FIG. 15. The controller 700 is configured to perform the state determination process P200 periodically (for example, each day).

In step S201, the controller 700 estimates the flow rate Q of the HPM filter FHPM. Specifically, the controller 700 estimates the flow rate Q by, for example, the following method.

First, the controller 700 is configured to control the HPM 500 and the air pressure regulator 600 to feed ink in the main tank 410 to the drain tank DT, through the supply channel SCH and the head channel HCH. At this time, the controller 700 is configured not to discharge ink from the drain tank DT to the discharge channel DCH. In this state, the controller 700 is configured to acquire the slope X of the detection value of the fill tank sensor 31 and the slope Y of the detection value of the drain tank sensor 32.

As shown in FIG. 10, when a flow rate of ink flowing from the supply channel SCH into the fill tank FT in a prescribed period is an inflow amount QFIN, and a flow rate of ink flowing out from the fill tank FT into the head channel HCH in the prescribed period is an outflow amount QFOUT, a change amount ΔQF of a storage amount of the ink in the fill tank FT in the prescribed period is represented by Equation (2).

$$\Delta QF = \mathrm{QFIN} - \mathrm{QFOUT} \qquad \text{Equation (2)}$$

Further, when a flow rate of ink flowing from the head channel HCH into the drain tank DT in a prescribed period is an inflow amount QDIN and a flow rate of ink flowing out from the drain tank DT into the discharge channel DCH in the prescribed period is an outflow amount QDOUT, a change amount ΔQD of a storage amount of ink in the drain tank DT in the prescribed period is represented by Equation (3).

$$\Delta QD = \mathrm{QDIN} - \mathrm{QDOUT} \qquad \text{Equation (3)}$$

Here, when the ink in the main tank 410 is fed to the drain tank DT through the supply channel SCH and the head channel HCH, the outflow amount QFOUT and the inflow amount QDIN are equal to each other since no liquid is extruded from the head 42. Since no ink is discharged from the drain tank DT to the discharge channel DCH, the outflow amount QDOUT is zero. Equation (4) can be obtained based on the above conditions and Equations (2) and (3).

$$\Delta QF + \Delta QD = \mathrm{QFIN} \qquad \text{Equation (4)}$$

A left side of Equation (4) is a sum of the change amount ΔQF of the storage amount of ink in the fill tank FT in the prescribed period and the change amount ΔQD of the storage amount of ink in the drain tank DT in the prescribed period. This value (ΔQF+ΔQD) corresponds to a sum of the slope X of the detection value of the fill tank sensor 31 and the slope Y of the detection value of the drain tank sensor 32, based on a correspondence shown in FIGS. 13A and 13B. On the other hand, a right side of Equation (4) is the flow rate of ink flowing into the fill tank FT from the supply channel SCH, and is equal to the flow rate Q of the HPM filter FHPM.

Accordingly, the controller 700 is configured to acquire the slope X of the detection value of the fill tank sensor 31 and the slope Y of the detection value of the drain tank sensor 32 while feeding the ink in the main tank 410 to the drain tank DT through the supply channel SCH and the head channel HCH, in a state where no ink is discharged from the drain tank DT to the discharge channel DCH. Then, the flow rate Q of the HPM filter FHPM is estimated based on the sum of the acquired slope X and slope Y. The sum of the slope X and the slope Y is an example of a "value based on the first change amount and the second change amount". In addition to the simple sum of the slope X and the slope Y, the "value based on the first change amount and the second change amount" may be, for example, a value corrected by multiplying the slope X and/or the slope Y by a coefficient to further improve accuracy of an estimated value of the flow rate Q.

The controller 700 may be configured to acquire the slope X of the detection value of the fill tank sensor 31 and the slope Y of the detection value of the drain tank sensor 32 while feeding ink in the fill tank FT to the main tank 410 through the head channel HCH and the discharge channel DCH. At this time, the controller 700 does not supply ink from the supply channel SCH to the fill tank FT. In this case, the inflow amount QFIN is zero, and the outflow amount QFOUT and the inflow amount QDIN are equal to each other. Equation (5) can be obtained based on the above conditions and Equations (2) and (3).

$$-(\Delta QF + \Delta QD) = \mathrm{QDOUT} \qquad \text{Equation (5)}$$

A right side of Equation (5) is the flow rate of ink flowing into the discharge channel DCH from the drain tank DT, and is equal to the flow rate Q of the HPM filter FHPM. The controller 700 may be configured to estimate the flow rate Q of the HPM filter FHPM, based on the sum of the acquired slope X and slope Y.

In step S202, the controller 700 calculates the lifetime of the HPM filter FHPM, based on the estimated flow rate Q of the HPM filter FHPM. The controller 700 may be configured to calculate the lifetime of the HPM filter FHPM by substantially the same method as that of step S103 of the state determination process P100.

Figure 16A:
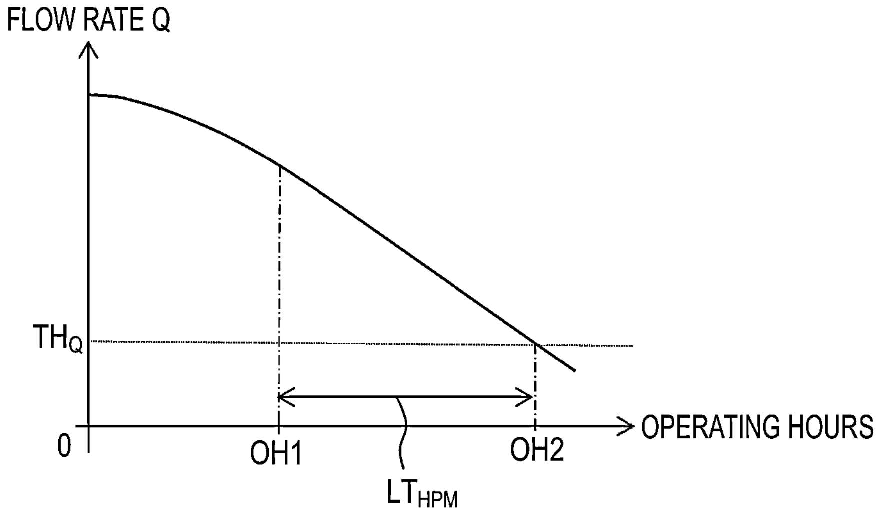
FIG. 16A is a graph showing a relationship between operating hours of the HPM filter and the flow rate of the HPM filter.

Specifically, as shown in FIG. 16A, the flow rate Q of the HPM filter FHPM decreases as the operating hours of the printer 1000 increase, that is, as the operating hours of the HPM filter FHPM. This is because the HPM filter FHPM deteriorates or minute clogging accumulates due to use, and the amount of ink flowing through the HPM filter FHPM, in other words, the amount of ink flowing through the supply channel SCH and the discharge channel DCH decreases. When the flow rate Q of the HPM filter FHPM decreases to a threshold THQ, it is considered that the HPM filter FHPM is unsuitable for use.

Here, assuming that the current operating hours are the operating hours OH1 and the operating hours when the flow rate Q of the HPM filter FHPM decreases to the threshold THQ are the operating hours OH2, a period from the operating hours OH1 to the operating hours OH2 corresponds to the lifetime LTHPM of the HPM filter FHPM.

Figure 16B:
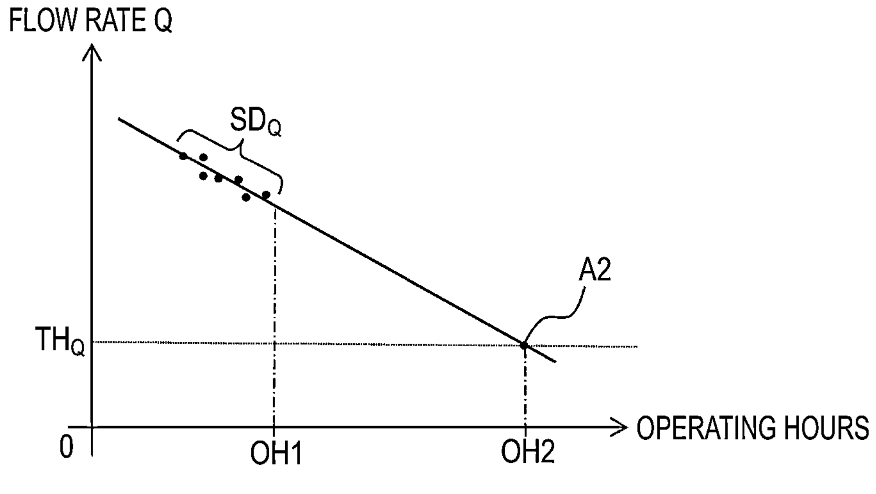
FIG. 16B is a schematic diagram showing an example of a method for calculating a lifetime of the HPM filter.

In view of the above, the controller 700 is configured to estimate the lifetime LTHPM of the HPM filter FHPM, based on time-series data SDQ of the flow rate Q of the HPM filter FHPM accumulated in the state determination process P200 performed so far. For example, the controller 700 is configured to calculate the lifetime LTHMP by obtaining a slope of a temporal change of the flow rate Q, based on the time-series data SDQ. Specifically, for example, as shown in FIG. 16B, the controller 700 obtains a straight line passing through the time-series data SDQ of the flow rate Q of the HPM filter FHPM by a linear approximation method such as the least squares method, and obtains a point A2 at which the value of the flow rate Q indicated by the straight line matches the threshold THQ. Then, the lifetime LTHPM of the HPM filter FHPM is calculated as a difference between the operating hours OH2 indicated by the point A2 and the current operating hours OH1.

In step S203, the controller 700 determines whether the calculated filter lifetime LTHPM is equal to or less than a first threshold TH1HPM, which is an example of a "second filter threshold". The first threshold TH1HPM may be, for example, about several months to several years.

In a case where the filter lifetime LTHPM is greater than the first threshold TH1HPM (S203: NO), the controller 700 causes the display unit 900 to displays information indicating that the state of the HPM filter FHPM is normal (S206), and ends the state determination process P200. The information indicating that the state of the HPM filter FHPM is normal may be, for example, text information or an icon that indicates "normal". The display indicating that the filter lifetime LTHPM is larger than the first threshold TH1HPM is also an example of the display of information indicating that the state of the HPM filter FHPM is normal.

In a case where the filter lifetime LTHPM is equal to or less than the first threshold TH1HPM (S203: YES), the controller 700 determines whether the filter lifetime LTHPM is less than a second threshold TH2HPM, which is an example of a "second filter notification threshold", in step S204. The second threshold TH2HPM is a value smaller than the first threshold TH1HPM, and may be about several days to several weeks as an example.

In a case where the filter lifetime LTHPM is equal to or greater than the second threshold TH2HPM (S204: NO), the controller 700 causes the display unit 900 to display the filter lifetime LTHPM calculated in step S202 (S207), and ends the state determination process P200. In a case where the filter lifetime LTHPM is smaller than the second threshold TH2HPM (S204: YES), the controller 700 advances the process to step S205, and performs a HPM maintenance alert, which is an example of a "notification related to the second filter". Specifically, the controller 700 causes the display unit 900 to display information indicating that maintenance, which is, specifically, for example, replacement of the HPM filter FHPM, of the HPM 500 is necessary. Thereafter, the controller 700 ends the state determination process P200.

(2-2) State Determination Based on Rotational Speed of Pump P

The state determination of the HPM filter FHPM, based on the rotational speed of the pump P will be described. The printer 1000 may determine the state of the HPM filter FHPM, based on the rotational speed of the pump P in an embodiment in which, for example, the rotational speed of the pump P is feedback-controlled and changes according to the state of the HPM filter FHPM. In the present embodiment, the controller 700 is configured to determine the state of the HPM filter FHPM and is configured to present information corresponding to a determination result to the user by performing a state determination process P300 shown in a flowchart of FIG. 17. The controller 700 is configured to perform the state determination process P300 periodically (for example, each day).

In step S301, the controller 700 acquires the rotational speed of the pump P. Specifically, for example, the controller 700 is configured to receive a signal indicating the rotational speed of the pump P, from a sensor such as an encoder (not shown) provided in the pump P.

In step S302, the controller 700 calculates the lifetime of the HPM filter FHPM, based on the rotational speed of the pump P. The controller 700 may be configured to calculate the lifetime of the HPM filter FHPM by substantially the same method as that of step S103 of the state determination process P100.

Figure 18A:
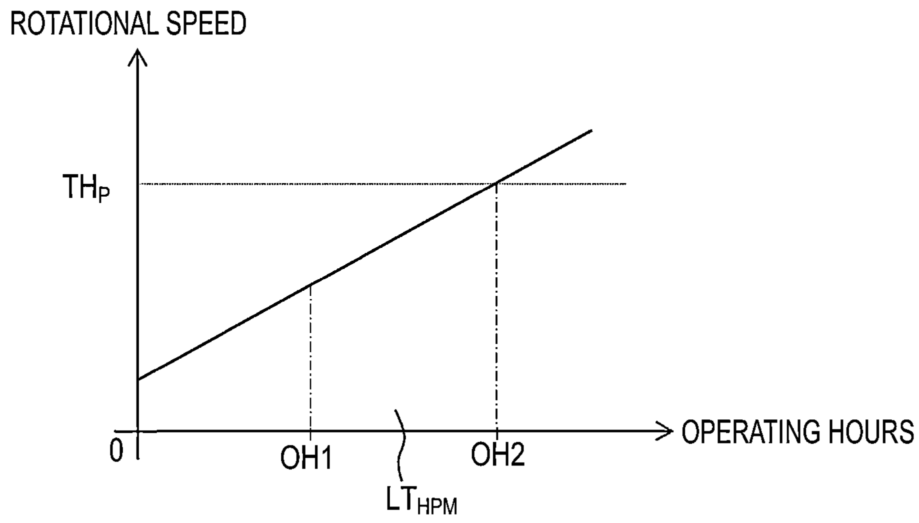
FIG. 18A is a graph showing a relationship between the operating hours of the HPM filter and the rotational speed of the pump.

Specifically, as shown in FIG. 18A, the rotational speed of the pump P increases as the operating hours of the printer 1000 increase, that is, as the operating hours of the HPM filter FHPM increase. This is because the HPM filter FHPM deteriorates due to use, and it is necessary to increase the rotational speed of the pump P to maintain the amount of ink flowing through the HPM filter FHPM constant. When the rotational speed of the pump P increases to a threshold THP, it is considered that the HPM filter FHPM is not suitable for use. For example, the controller 700 is configured to recognize that the amount of ink flowing through the HPM filter FHPM is maintained constant, based on a detection value of a flow meter (not shown) located in the supply channel SCH, or the sum of the slope X of the detection value of the fill tank sensor 31 and the slope Y of the detection value of the drain tank sensor 32.

Figure 18B:
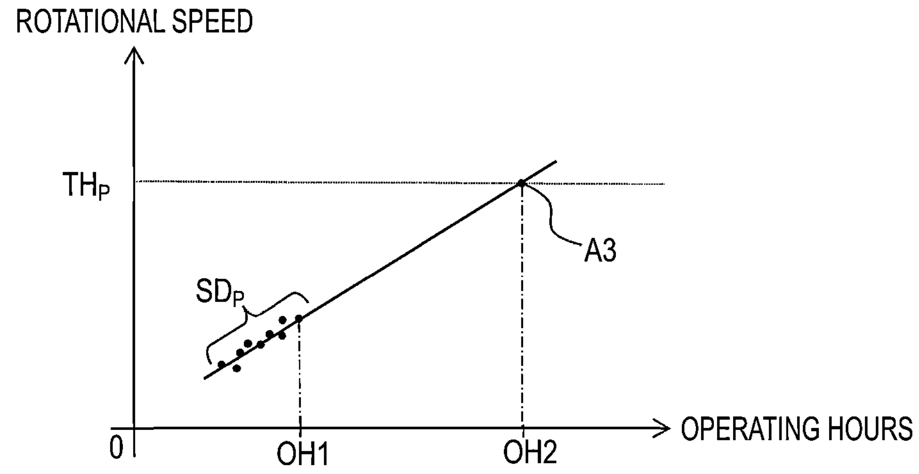
FIG. 18B is a schematic diagram showing another example of the method for calculating the lifetime of the HPM filter.

In view of the above, the controller 700 is configured to estimate the lifetime LTHPM of the HPM filter FHPM, based on time-series data SDP of the rotational speed of the pump P accumulated in the state determination process P300 performed so far. For example, the controller 700 is configured to calculate the lifetime LTHMP by obtaining a slope of a temporal change of the rotational speed of the pump P based on the time-series data SDP. Specifically, for example, as shown in FIG. 18B, the controller 700 is configured to obtain a straight line passing through the time-series data SDP of the rotational speed of the pump P by a linear approximation method such as the least squares method, and is configured to obtain a point A3 at which the value of the rotational speed indicated by the straight line matches the threshold THP. Then, the lifetime LTHPM of the HPM filter FHPM is calculated as a difference between the operating hours OH2 indicated by the point A3 and the current operating hours OH1.

In step S303, the controller 700 determines whether the calculated filter lifetime LTHPM is equal to or less than the first threshold TH1HPM, which is an example of the "second filter threshold". The first threshold TH1HPM may be, for example, about several months to several years.

In a case where the filter lifetime LTHPM is larger than the first threshold TH1HPM (S303: NO), the controller 700 causes the display unit 900 to display information indicating that the state of the head filter FHPM is normal (S306), and ends the state determination process P300. The information indicating that the state of the HPM filter FHPM is normal may be, for example, text information or an icon that indicates "normal". The display indicating that the filter lifetime LTHPM is larger than the first threshold TH1HPM is also an example of the display of information indicating that the state of the HPM filter FHPM is normal.

In a case where the filter lifetime LTHPM is equal to or less than the first threshold TH1HPM (S303: YES), the controller 700 determines whether the filter lifetime LTHPM is less than the second threshold TH2HPM, which is an example of the "second filter notification threshold", in step S304. The second threshold TH2HPM is a value smaller than the first threshold TH1HPM, and may be about several days to several weeks as an example.

In a case where the filter lifetime LTHPM is equal to or greater than the second threshold TH2HPM (S304: NO), the controller 700 causes the display unit 900 to display the filter lifetime LTHPM calculated in step S302 (S307), and ends the state determination process P300. In a case where the filter lifetime LTHPM is smaller than the second threshold TH2HPM (S304: YES), the controller 700 performs a HPM maintenance alert, which is an example of the "notification related to the second filter", in step S305. Specifically, the controller 700 causes the display unit 900 to display information indicating that maintenance, which is, specifically, for example, replacement of the HPM filter FHPM, of the HPM 500 is necessary. Thereafter, the controller 700 ends the state determination process P300.

The printer 1000 and the filter state determination according to the present embodiment are summarized below.

In the printer 1000 according to the present embodiment, the controller 700 is configured to perform the state determination process P100, and the state determination process P200 or the state determination process P300. Accordingly, the state of the head filter FHD and the state of the HPM filter FHPM can be determined independently of each other, and the controller 700 is configured to determine which filter of the head filter FHD and the HPM filter FHPM has an abnormality.

In the printer 1000 according to the present embodiment, the state determination process P100 and the state determination process P200 or the state determination process P300 are performed using the liquid surface detector 30 of the head system 100, which is the fill tank sensor 31 and the drain tank sensor 32, and/or the rotational speed of the pump P of the HPM 500. Accordingly, it is not necessary to provide a dedicated sensor or the like for determining the state of the head filter FHD and the state of the HPM filter FHPM, which is advantageous in reducing a size of the printer 1000 and manufacturing costs of the printer 1000. Since no dedicated structure for determining the state of the head filter FHD and the state of the HPM filter FHPM is required, channel structures would not be complicated.

In the printer 1000 according to the present embodiment, the controller 700 is configured to determine whether the differential pressure PD is appropriately controlled (the state determination process P100, step S101), and is configured to calculate the lifetime of the head filter HFD in a case where it is determined that the differential pressure PD is appropriately controlled (the state determination process P100, step S103). Accordingly, the lifetime can be calculated with higher accuracy. When a determination whether the differential pressure PD is appropriately controlled is not performed, a change in the flow rate of the head channel HSC may not be a change in the state of the head filter HFD and may be caused by the not appropriately controlled air pressure regulator 600. For this reason, accuracy and reliability of the calculated lifetime may decrease.

In the printer 1000 according to the present embodiment, the controller 700 is configured to determine whether the slope X of the detection value of the fill tank sensor 31 or the slope Y of the detection value of the drain tank sensor 32 rapidly decreases in a short period (the state determination process P100, step S102). Accordingly, it is possible to appropriately detect clogging of the head filter FHD due to contamination of foreign matter or the like.

[Modifications]

In the above-described embodiment, the following modifications can also be used.

(Modification 1)

In the above-described embodiment, the controller 700 performs the state determination of the head filter FHD by performing the state determination process P100 (FIG. 11). However, there are various processes for determining the state of the head filter FHD, which is not limited to the process according to the state determination process P100.

Figure 19:
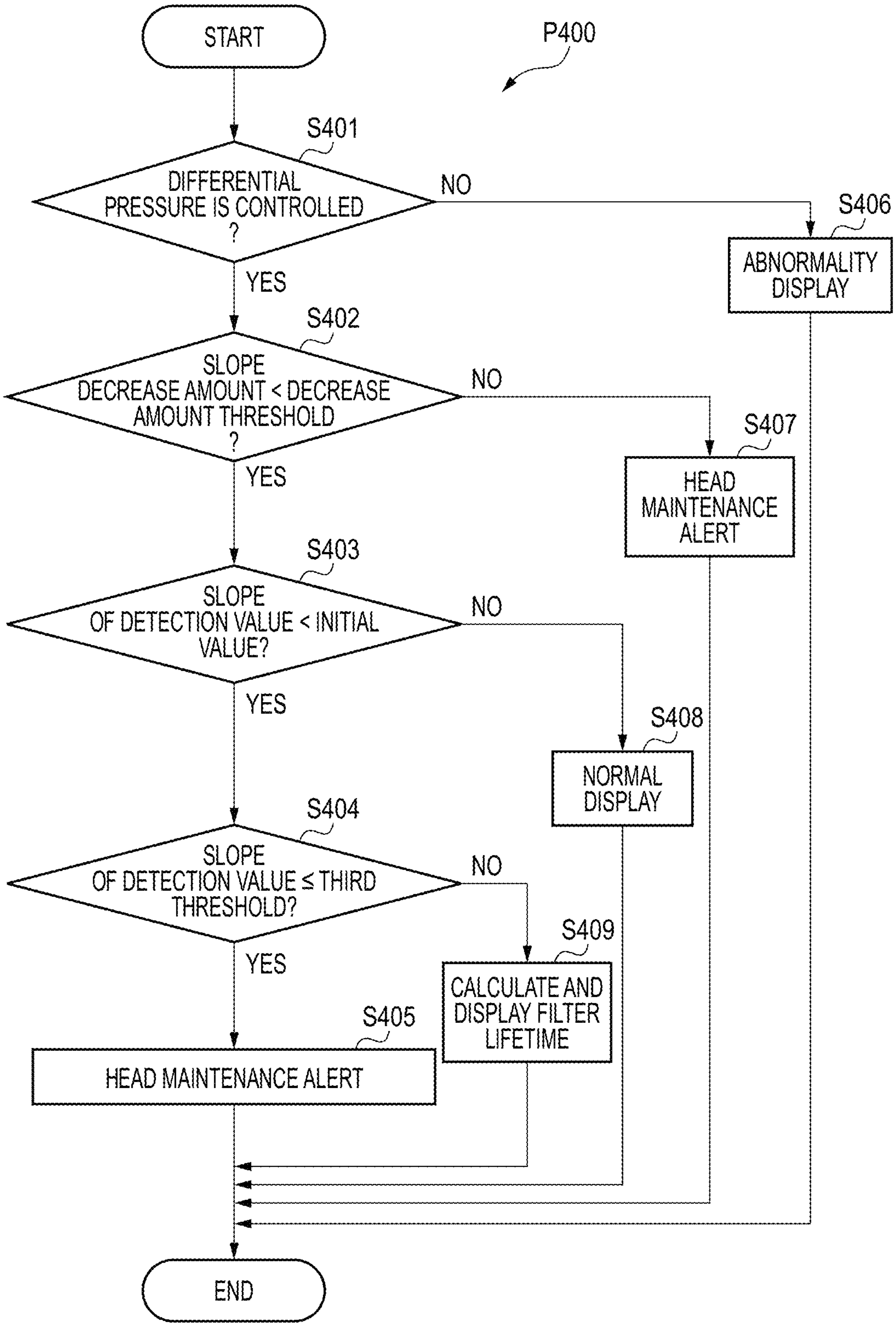
FIG. 19 is a flowchart showing a state determination process for determining the state of the head filter.

Specifically, for example, the controller 700 may be configured to determine the state of the head filter FHD by performing a state determination process P400 shown in FIG. 19. A main difference of the state determination process P400 from the state determination process P100 is that a display content on the display unit 900 is determined based on a comparison between the slope X of the detection value of the fill tank sensor 31 or the slope Y of the detection value of the drain tank sensor 32 and a threshold, instead of the comparison between the lifetime of the head filter FHD and a threshold. The main difference of the state determination process P400 from the state determination process P100 is that steps S403 and S404 are performed instead of steps S103 to S105, according to the flowchart of FIG. 11 and a flowchart of FIG. 19.

Hereinafter, the state determination process P400 will be described with an example in which the slope Y of the detection value of the drain tank sensor 32 is used as the value indicating the flow rate of the ink flowing through the head channel HCH. The state determination process P400 can be performed in the same procedure as described below when the slope X of the detection value of the fill tank sensor 31 is used as the value indicating the flow rate of the ink flowing through the head channel HCH.

In step S401 of the state determination process P400, the controller 700 determines whether the differential pressure PD between the fill tank FT and the drain tank DT is appropriately controlled. Specifically, step S401 may be the same as step S101 of the state determination process P100.

When determining that the differential pressure PD is not appropriately controlled (step S401: NO), the controller 700 causes the display unit 900 to display information indicating that an abnormality occurs in the control of the differential pressure PD (step S406), and ends the state determination process P400.

When determining that the differential pressure PD is appropriately controlled (step S401: YES), in step S402, the controller 700 determines whether the slope Y of the detection value of the drain tank sensor 32 significantly decreases as compared with the previous state determination process P400. Specifically, step S402 may be the same as step S102 of the state determination process P100. That is, the controller 700 is configured to determine whether the slope decrease amount ΔY is smaller than the decrease amount threshold THΔY.

In a case where the slope decrease amount ΔY is equal to or greater than the decrease amount threshold THΔY (S402: NO), the controller 700 advances the process to step S407 and performs a head maintenance alert, which is an example of the "notification related to the first filter". Specifically, the controller 700 is configured to cause the display unit 900 to display information indicating that maintenance of the head 43, which is, for example, replacement of the head filter FHD, and replacement of the head 43, is necessary. The head maintenance alert performed by the controller 700 in step S407 is based on a sudden decrease in the slope Y (that is, the flow rate of the ink flowing through the head channel HCH), and is considered to be urgent. For this reason, the controller 700 may be configured to cause the display unit 900 to display information prompting the user to immediately replace a component. Thereafter, the controller 700 ends the state determination process P400.

In a case where the slope decrease amount ΔY is smaller than the decrease amount threshold THΔY (S402: YES), the controller 700 determines whether the slope Y of the detection value of the drain tank sensor 32 is smaller than an initial value IVY in step S403. Here, the initial value IVY is a value of the slope Y of the detection value of the drain tank sensor 32 at a start of use of the head filter FHD. The initial value IVY may be acquired by, for example, measurement in a case where ink flows into the head filter FHD for a first time after the head filter FHD is newly attached to the head 43 or after the head 43 is newly attached to the printer 1000.

In a case where the slope Y is equal to or greater than the initial value IVY (S403: NO), the controller 700 causes the display unit 900 to display information indicating that the state of the head filter FHD is normal (S408), and ends the state determination process P400. In a case where the slope Y is smaller than the initial value IVY (S403: YES), the controller 700 determines in step S404 whether the slope Y is equal to or smaller than a third threshold TH3HD, which is an example of the "first filter notification threshold" and is a value smaller than the initial value IVY.

In a case where the slope Y is larger than the third threshold TH3HD (S404: NO), the controller 700 calculates the lifetime of the head filter FHD and causes the display unit 900 to display the calculated lifetime, in step S409. The lifetime of the head filter FHD can be calculated by the same procedure as that of step S103 of the state determination process P100. In step S409, the controller 700 may display the filter lifetime LTHD as the lifetime of the head 43. After executing step S409, the controller 700 ends the state determination process P400.

In a case where the slope Y is equal to or less than the third threshold TH3HD (S404: YES), the controller 700 performs a head maintenance alert, which is an example of the "notification related to the first filter", in step S405. Specifically, the controller 700 is configured to cause the display unit 900 to display information indicating that maintenance of the head 43, which is, for example, replacement of the head filter FHD, and replacement of the head 43, is necessary. The head maintenance alert performed by the controller 700 in step S405 is based on a predetermined gradual decrease in the slope Y (that is, the flow rate of the ink flowing through the head channel HCH), and it is considered not as urgent as the head maintenance alert executed in step S407. For this reason, the controller 700 may perform the display in a form different from that in step S407, and may display, for example, information prompting the user to execute replacement soon. Thereafter, the controller 700 ends the state determination process P400.

(Modification 2)

Figure 15:
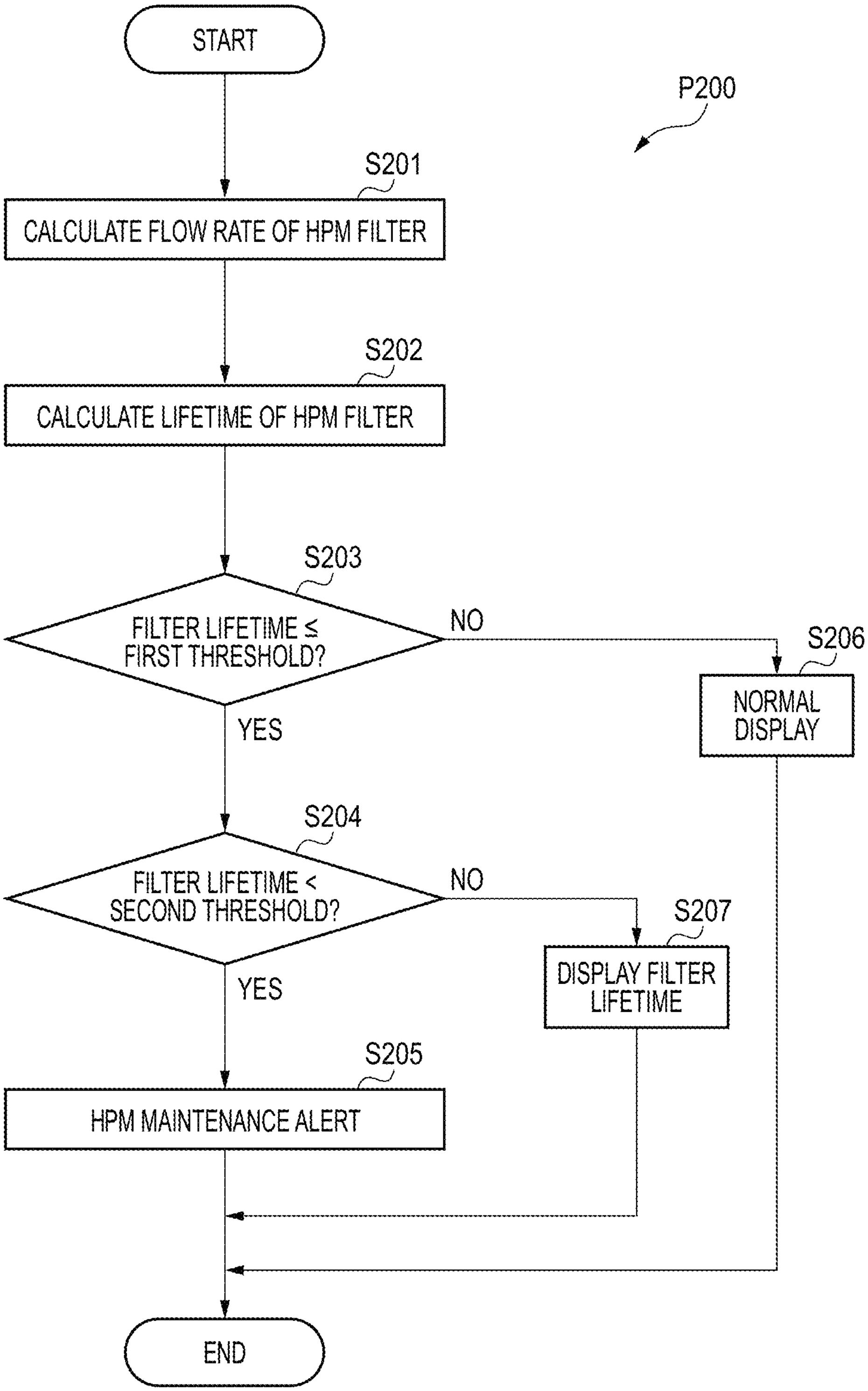
FIG. 15 is a flowchart showing a state determination process for determining a state of a HPM filter, based on a flow rate of the HPM filter.

In the above-described embodiment, the controller 700 is configured to determine the state of the HPM filter FHPM based on the flow rate Q of the HPM filter FHPM by performing the state determination process P200 (FIG. 15). However, there are various processes for determining the state of the HPM filter FHPM based on the flow rate Q of the HPM filter FHPM, which is not limited to the process according to the state determination process P200.

Figure 20:
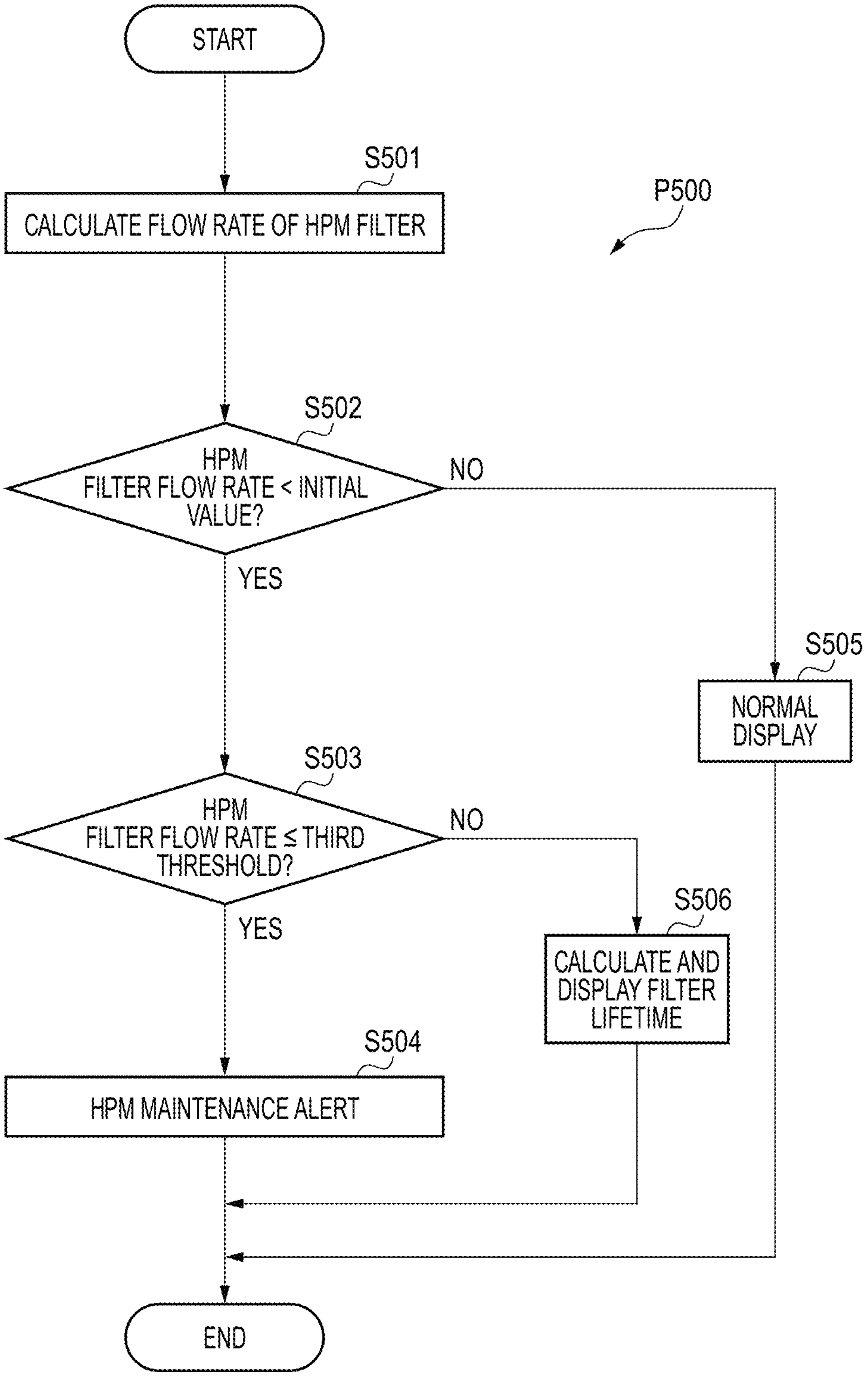
FIG. 20 is a flowchart showing a state determination process for determining the state of the HPM filter based on the flow rate of the HPM filter.

Specifically, for example, the controller 700 may be configured to determine the state of the HPM filter FHPM by performing a state determination process P500 shown in FIG. 20. A main difference of the state determination process P500 from the state determination process P200 is that a display content on the display unit 900 is determined based on a comparison between the flow rate Q of the HPM filter FHPM and a threshold, instead of the comparison between the lifetime of the HPM filter FHPM and a threshold. The main difference of the state determination process P500 from the state determination process P200 is that steps S502 and S503 are executed instead of steps S202 to S204, according to the flowchart of FIG. 15 and a flowchart of FIG. 20.

In step S501 of the state determination process P500, the controller 700 estimates the flow rate Q of the HPM filter FHPM. A specific procedure of step S501 may be the same as that of step S201 of the state determination process P200.

In step S502, the controller 700 determines whether the flow rate Q of the HPM filter FHPM estimated in step S501 is smaller than an initial value IVQ. Here, the initial value IVQ is a value of the flow rate Q at a start of use of the HPM filter FHPM. The initial value IVQ may be acquired by, for example, measurement in a case where ink flows into the HPM filter FHPM for a first time after the HPM filter FHPM is newly attached to the HPM 500.

In a case where the flow rate Q is equal to or greater than the initial value IVQ (S502: NO), the controller 700 causes the display unit 900 to display information indicating that the state of the HPM filter FHPM is normal (S505), and ends the state determination process P500. In a case where the flow rate Q is smaller than the initial value IVQ (S502: YES), the controller 700 determines in step S503 whether the flow rate Q is equal to or less than a third threshold TH3HPMQ, which is an example of the "second filter notification threshold" and is a value smaller than the initial value IVQ.

In a case where the flow rate Q is larger than the third threshold TH3HPMQ (S503: NO), the controller 700 calculates the lifetime of the HPM filter FHPM and causes the display unit 900 to display the calculated lifetime in step S506. The lifetime of the HPM filter FHPM can be calculated by the same procedure as that of step S202 of the state determination process P200. After executing step S506, the controller 700 ends the state determination process P500.

In a case where the flow rate Q is equal to or less than the third threshold TH3HPMQ (S503: YES), the controller 700 executes a head maintenance alert, which is an example of the "notification related to the second filter", in step S504. Specifically, the controller 700 causes the display unit 900 to display information indicating that maintenance, which is, specifically, for example, replacement of the HPM filter FHPM, of the HPM 500 is necessary. Thereafter, the controller 700 ends the state determination process P500.

(Modification 3)

Figure 17:
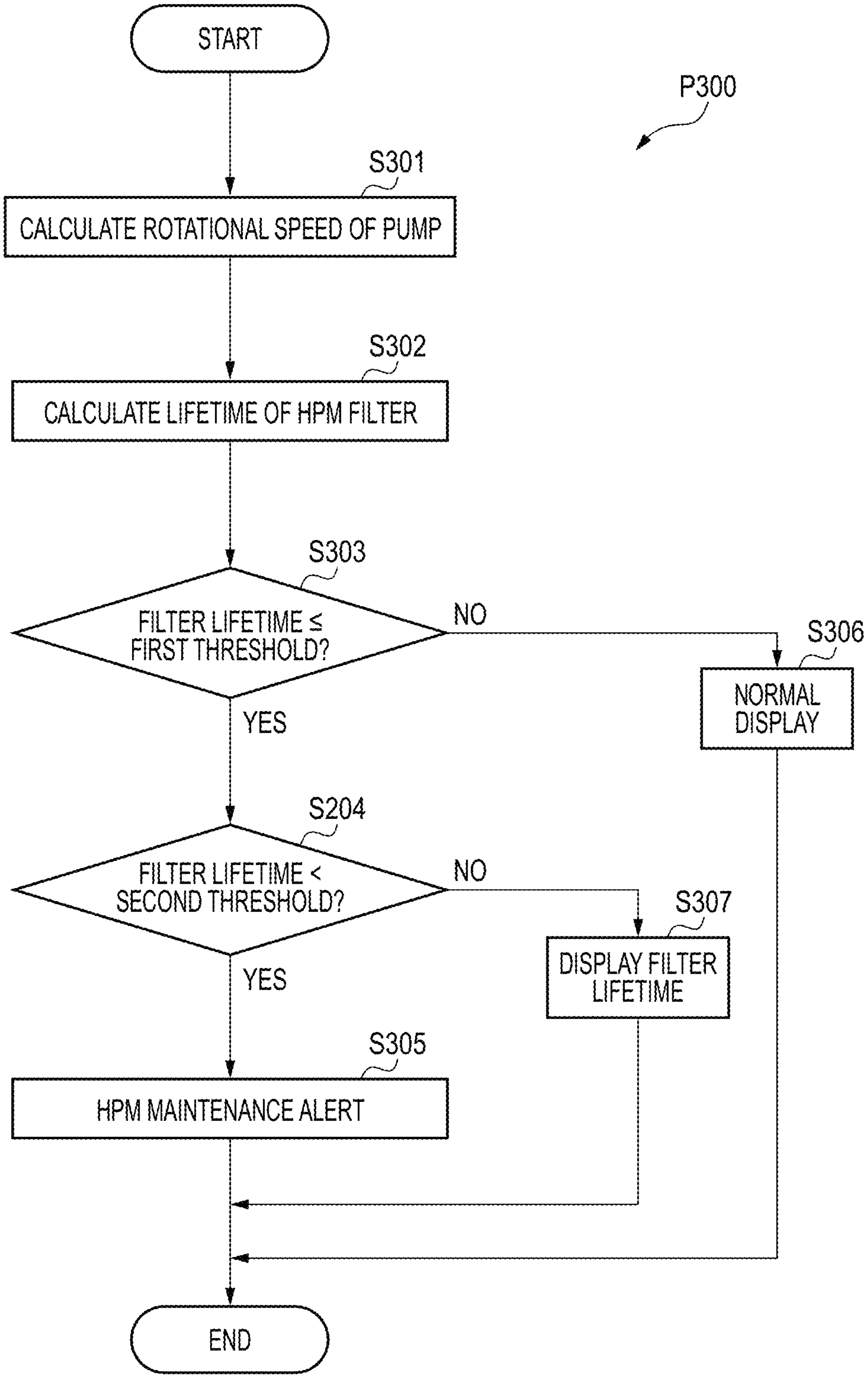
FIG. 17 is a flowchart showing a state determination process for determining the state of the HPM filter based on a rotational speed of a pump.

In the above-described embodiment, the controller 700 determines the state of the HPM filter FHPM based on the rotational speed of the pump P by performing the state determination process P300 (FIG. 17). However, there are various processes for determining the state of the HPM filter FHPM based on the rotational speed of the pump P, which is not limited to the process according to the state determination process P300.

Figure 21:
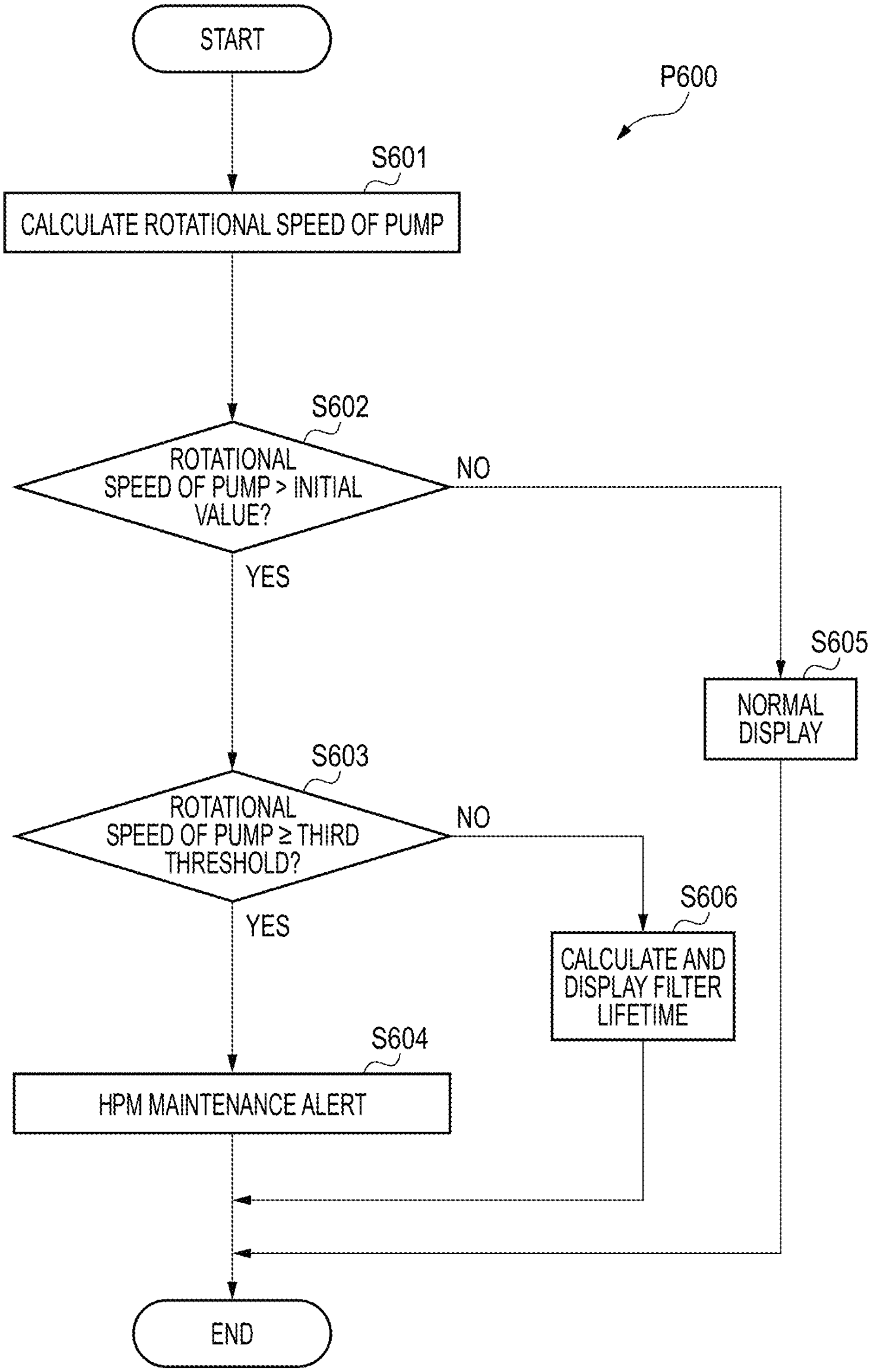
FIG. 21 is a flowchart showing a state determination process for determining the state of the HPM filter based on the rotational speed of the pump.

Specifically, for example, the controller 700 may be configured to determine the state of the HPM filter FHPM by performing a state determination process P600 shown in FIG. 21. A main difference of the state determination process P600 from the state determination process P300 is that a display content on the display unit 900 is determined based on a comparison between the rotational speed of the pump P and a threshold, instead of the comparison between the lifetime of the HPM filter FHPM and a threshold. The main difference of the state determination process P600 from the state determination process P300 is that steps S602 and S603 are performed instead of steps S302 to S304, according to the flowchart of FIG. 17 and a flowchart of FIG. 21.

In step S601 of the state determination process P600, the controller 700 calculates the rotational speed of the pump P. A specific procedure of step S601 may be the same as that of step S301 of the state determination process P300.

In step S602, the controller 700 determines whether the rotational speed of the pump P calculated in step S601 is larger than an initial value IVP. Here, the initial value IVP is a value of the rotational speed of the pump P at a start of use of the HPM filter FHPM. The initial value IVP may be acquired by, for example, measurement in a case where ink flows into the HPM filter FHPM for a first time after the HPM filter FHPM is newly attached to the HPM 500.

In a case where the rotational speed of the pump P is equal to or lower than the initial value IVP (S602: NO), the controller 700 causes the display unit 900 to display information indicating that the state of the HPM filter FHPM is normal (S605), and ends the state determination process P600. In a case where the rotational speed of the pump P is higher than the initial value IVP (S602: YES), the controller 700 determines in step S603 whether the rotational speed of the pump P is equal to or higher than a third threshold TH3HPMP, which is an example of the "second filter notification threshold" and is a value larger than the initial value IVP.

In a case where the rotational speed of the pump P is lower than the third threshold TH3HPMP (S603: NO), the controller 700 calculates the lifetime of the HPM filter FHPM and causes the display unit 900 to display the calculated lifetime, in step S606. The lifetime of the HPM filter FHPM can be calculated by the same procedure as that of step S302 of the state determination process P300. After executing step S606, the controller 700 ends the state determination process P600.

In a case where the rotational speed of the pump P is equal to or higher than the third threshold TH3HPMP (S603: YES), the controller 700 performs a head maintenance alert, which is an example of the "notification related to the second filter", in step S604. Specifically, the controller 700 causes the display unit 900 to display information indicating that maintenance, which is, specifically, for example, replacement of the HPM filter FHPM, of the HPM 500 is necessary. Thereafter, the controller 700 ends the state determination process P600.

(Other Modifications)

In the printer 1000 according to the above-described embodiment and modifications, the controller 700 is configured to periodically perform the state determination processes P100 to P600. However, the present invention is not limited thereto. The controller 700 may be configured to perform at least one of the state determination processes P100 to P600 at a freely selected timing. The freely selected timing is, for example, a timing at which a prescribed process, which is maintenance process or the like, ends, or a timing at which an instruction to execute the state determination process is received from the user.

In the printer 1000 according to the above-described embodiment and modifications, the controller 700 visually displays and notifies of information in the state determination processes P100 to P600 on the display unit 900, and the present invention is not limited thereto. The display and notification of the information may be executed in any form that can be perceived by the user, and for example, may be audibly executed through an audio display unit (not shown).

In the above-described embodiment and modifications, a step of the state determination processes P100 to P600 may be appropriately omitted. Specifically, for example, steps S101 and S102 of the state determination process P100 and steps S401 and S402 of the state determination process P400 may not be performed.

In the above-described embodiment and modifications, the fill tank sensor 31 and the drain tank sensor 32 provided in the liquid surface detector 30 of the head system 100 are both static capacitive liquid surface detection sensors, and the fill tank sensor 31 and the drain tank sensor 32 are not limited thereto. The fill tank sensor 31 and the drain tank sensor 32 may be any liquid surface detection sensors (for example, a float type, an optical type, or a radio wave type) that may respectively detect positions of liquid surfaces in the fill tank FT and the drain tank DT. The fill tank sensor 31 and the drain tank sensor 32 are not limited to the liquid surface detection sensors, and may be any liquid amount sensors that may detect liquid amounts in the fill tank FT and the drain tank DT. The liquid amount sensors may be any liquid amount sensors, and may detect the liquid amounts in the fill tank FT and the drain tank DT, based on, for example, masses of liquid in the fill tank FT and the drain tank DT. The liquid surface detection sensors are a form of liquid amount sensors.

In the above-described embodiment and modifications, the HPM filter FHPM is provided between the pump P and the fill tank FT in the supply channel SCH of the HPM 500, and the present invention is not limited thereto. In the supply channel SCH, the HPM filter HPM may be disposed between the main tank 410 and the pump P. In addition, the head filter FHD may be disposed in any position in the head channel HCH, and the HPM filter FHPM may be disposed in any position in the supply channel SCH.

In the above-described embodiment and modifications, the controller 700 provided in the printer 1000 is configured to perform the state determination processes P100 to P600, and the present invention is not limited thereto. An external device (for example, a PC) different from the printer 1000 may function as a controller to perform the state determination processes P100 to P600. In this case, the printer 1000 and the external device constitute a liquid discharge system. In addition, the display and the notification of the information in the state determination processes P100 to P600 may be performed by the external device instead of the display unit 900.

The embodiment and modifications have been described above with an example in which an image is formed on the medium PM by discharging ink from the head system 100. The head system 100 may be a liquid discharge system configured to discharge any liquid for image formation, and the medium PM on which an image is formed may be, for example, a sheet, cloth, or a resin.

It should be considered that the embodiment described in the present specification is illustrative in all respects and are not restrictive. For example, the number and configuration of the head system 100 in the printer 1000 may be changed. The number of colors that can be simultaneously printed by the printer 1000 is not limited, and the printer 1000 may print only a single color. In addition, the number, arrangements, and the like of the individual channels iCH may be appropriately changed. Technical features described in the embodiment and modifications can be combined with each other. The printer 1000 may include, instead of the head system 100, a serial head configured to discharge liquid while moving in a scanning direction.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

It will be understood by those skilled in the art that the above-described embodiment and modifications thereof are specific examples of the following aspects.

Clause 1: A liquid discharge system for discharging liquid, the liquid discharge system including: a head configured to discharge the liquid, the head having an inlet for supplying the liquid to the head and an outlet for discharging the liquid from the head; a supply tank connected to the inlet; a discharge tank connected to the outlet; a pump configured to cause the liquid to flow, the liquid being in a supply channel for supplying the liquid to the supply tank; a first filter located in a head channel extending from the supply tank to the discharge tank through the head; a second filter located in the supply channel; a first liquid amount sensor configured to detect an amount of the liquid stored in the supply tank; a second liquid amount sensor configured to detect an amount of the liquid stored in the discharge tank; and a controller configured to: determine a state of the first filter, based on a first change amount or a second change amount, the first change amount being amount of change in a detection value of the first liquid amount sensor in a prescribed period, the second change amount being amount of change in a detection value of the second liquid amount sensor in a prescribed period; and determine a state of the second filter, based on a value or a rotational speed of the pump, the value being based on the first change amount and the second change amount.

Clause 2: The liquid discharge system according to clause 1, in which the controller is configured to perform a notification related to the first filter, in a case where a decrease in amount of newly acquired first change amount relative to previously acquired first change amount is equal to or greater than a decrease amount threshold, or in a case where a decrease amount of newly acquired second change amount relative to previously acquired second change amount is equal to or greater than the decrease amount threshold.

Clause 3: The liquid discharge system according to clause 1 or 2, in which the controller is configured to: calculate a lifetime of the first filter, based on the first change amount or the second change amount; and display that the state of the first filter is normal, in a case where the calculated lifetime is larger than a first filter threshold.

Clause 4: The liquid discharge system according to clause 3, in which the controller is configured to calculate the lifetime of the first filter, in a case where a decrease in amount of the newly acquired first change amount relative to the previously acquired first change amount is smaller than a decrease amount threshold, or in a case where a decrease in amount of the newly acquired second change amount relative to the previously acquired second change amount is smaller than the decrease amount threshold.

Clause 5: The liquid discharge system according to clause 3 or 4, in which the controller is configured to display the calculated lifetime, in a case where the calculated lifetime is equal to or less than the first filter threshold and is equal to or greater than a first filter notification threshold, the first filter notification threshold being smaller than the first filter threshold.

Clause 6: The liquid discharge system according to any one of clauses 3 to 5, in which the controller is configured to perform a notification related to the first filter, in a case where the calculated lifetime is smaller than a first filter notification threshold, the first filter notification threshold being smaller than the first filter threshold.

Clause 7: The liquid discharge system according to clause 1 or 2, in which the controller is configured to perform a notification related to the first filter, in a case where the first change amount or the second change amount is equal to or less than a first filter notification threshold, the first filter notification threshold being smaller than an initial value of the first change amount or the second change amount.

Clause 8: The liquid discharge system according to any one of clauses 1, 2, or 3, in which the controller is configured to: calculate a lifetime of the first filter, in a case where the first change amount or the second change amount is equal to or smaller than an initial value of the first change amount or the second change amount and is larger than a first filter notification threshold, the first filter notification threshold being smaller than the initial value; and display the calculated lifetime.

Clause 9: The liquid discharge system according to any one of clauses 3, 4, 5, 6, or 8, in which the controller is configured to calculate the lifetime of the first filter, based on a slope of a temporal change in the first change amount or the second change amount.

Clause 10: The liquid discharge system according to any one of clauses 1 to 9, in which the supply channel is connected to a storage tank, the discharge tank is connected to the storage tank, through a discharge channel for feeding the liquid in the discharge tank to the storage tank, and the controller is configured to determine whether a differential pressure between the supply tank and the discharge tank is normal, based on: a comparison between the second change amount in a case where the liquid stored in the supply tank is fed to the discharge tank through the head channel and the second change amount in a case where the liquid stored in the storage tank is fed to the discharge tank through the supply channel and the head channel; or a comparison between the first change amount in a case where the liquid stored in the supply tank is fed to the discharge tank through the head channel and the first change amount in a case where the liquid stored in the supply tank is fed to the storage tank through the head channel and the discharge channel.

Clause 11: The liquid discharge system according to any one of clauses 1 to 10, in which the controller is configured to: calculate a lifetime of the second filter, based on the value based on the first change amount and the second change amount; and display that the state of the second filter is normal, in a case where the calculated lifetime is larger than a second filter threshold.

Clause 12: The liquid discharge system according to clause 11, in which the controller is configured to display the calculated lifetime, in a case where the calculated lifetime is equal to or less than the second filter threshold and is equal to or greater than a second filter notification threshold, the second filter notification threshold being smaller than the second filter threshold.

Clause 13: The liquid discharge system according to clause 11 or 12, in which the controller is configured to perform a notification related to the second filter, in a case where the calculated lifetime is smaller than a second filter notification threshold, the second filter notification threshold being smaller than the second filter threshold.

Clause 14: The liquid discharge system according to any one of clauses 1 to 10, in which the controller is configured to perform a notification related to the second filter, in a case where the value based on the first change amount and the second change amount is equal to or less than a second filter notification threshold, the second filter notification threshold being smaller than an initial value of the value based on the first change amount and the second change amount.

Clause 15: The liquid discharge system according to any one of clauses 1, 2, 3, 4, 5, 6, 7, 8, 9, 10, and 14, in which the controller is configured to: calculate a lifetime of the second filter, in a case where the value is equal to or less than an initial value of the value and is greater than a second filter notification threshold smaller than the initial value of the value, the value being based on the first change amount and the second change amount; and display the calculated lifetime.

Clause 16: The liquid discharge system according to any one of clauses 11, 12, 13, and 15, in which the controller is configured to calculate the lifetime of the second filter, based on a slope of a temporal change in the value based on the first change amount and the second change amount.

Clause 17: The liquid discharge system according to any one of clauses 1 to 10, in which the controller is configured to: calculate a lifetime of the second filter, based on the rotational speed of the pump; and display that the state of the second filter is normal, in a case where the calculated lifetime is larger than a second filter threshold.

Clause 18: The liquid discharge system according to clause 17, in which the controller is configured to display the calculated lifetime, in a case where the calculated lifetime is equal to or less than the second filter threshold and is equal to or greater than a second filter notification threshold, the second filter notification threshold being smaller than the second filter threshold.

Clause 19: The liquid discharge system according to clause 17 or 18, in which the controller is configured to perform a notification related to the second filter, in a case where the calculated lifetime is smaller than a second filter notification threshold smaller than the second filter threshold.

Clause 20: The liquid discharge system according to any one of clauses 1 to 10, in which the controller is configured to perform a notification related to the second filter, in a case where the rotational speed of the pump is equal to or higher than a second filter notification threshold, the second filter notification threshold being larger than an initial value of the rotational speed of the pump.

Clause 21: The liquid discharge system according to any one of clauses 1, 2, 3, 4, 5, 6, 7, 8, 9, 10, 20, in which the controller is configured to: calculate a lifetime of the second filter, in a case where the rotational speed of the pump is equal to or higher than an initial value of the rotational speed of the pump and is lower than a second filter notification threshold, the second filter notification threshold being larger than the initial value of the rotational speed of the pump; and display the calculated lifetime.

Clause 22: The liquid discharge system according to any one of clauses 17, 18, 19, 21, in which the controller is configured to calculate the lifetime of the second filter, based on a slope of a temporal change in the rotational speed of the pump.

Clause 23: A filter state determination method performed by a controller of a liquid discharge system configured to discharge liquid, in which the liquid discharge system includes: a head configured to discharge the liquid, the head having an inlet for supplying the liquid to the head and an outlet for discharging the liquid from the head; a supply tank connected to the inlet; a discharge tank connected to the outlet; a pump configured to cause the liquid to flow, the liquid being in a supply channel for supplying the liquid to the supply tank; a first filter located in a head channel extending from the supply tank to the discharge tank through the head; a second filter located in the supply channel; a first liquid amount sensor configured to detect an amount of the liquid stored in the supply tank; and a second liquid amount sensor configured to detect an amount of the liquid stored in the discharge tank, and the filter state determination method comprises: determining a state of the first filter, based on a first change amount or a second change amount, the first change amount being amount of change in a detection value of the first liquid amount sensor in a prescribed period, the second change value being amount of change in a detection value of the second liquid amount sensor in a prescribed period; and determining a state of the second filter, based on a value or a rotational speed of the pump, the value being based on the first change amount and the second change amount.

What is claimed is:

1. A liquid discharge system for discharging liquid, the liquid discharge system comprising:

a head configured to discharge the liquid, the head having an inlet for supplying the liquid to the head and an outlet for discharging the liquid from the head;

a supply tank connected to the inlet;

a discharge tank connected to the outlet;

a pump configured to cause the liquid to flow, the liquid being in a supply channel for supplying the liquid to the supply tank;

a first filter located in a head channel extending from the supply tank to the discharge tank through the head;

a second filter located in the supply channel;

a first liquid amount sensor configured to detect an amount of the liquid stored in the supply tank;

a second liquid amount sensor configured to detect an amount of the liquid stored in the discharge tank; and a controller configured to:

determine a state of the first filter, based on a first change amount or a second change amount, the first change amount being amount of change in a detection value of the first liquid amount sensor in a prescribed period, the second change amount being amount of change in a detection value of the second liquid amount sensor in a prescribed period; and determine a state of the second filter, based on a value or a rotational speed of the pump, the value being based on the first change amount and the second change amount.

2. The liquid discharge system according to claim 1, wherein the controller is configured to perform a notification related to the first filter, in a case where a decrease in amount of newly acquired first change amount relative to previously acquired first change amount is equal to or greater than a decrease amount threshold, or in a case where a decrease amount of newly acquired second change amount relative to previously acquired second change amount is equal to or greater than the decrease amount threshold.

3. The liquid discharge system according to claim 1, wherein the controller is configured to:

calculate a lifetime of the first filter, based on the first change amount or the second change amount; and display that the state of the first filter is normal, in a case where the calculated lifetime is larger than a first filter threshold.

4. The liquid discharge system according to claim 3, wherein the controller is configured to calculate the lifetime of the first filter, in a case where a decrease in amount of the newly acquired first change amount relative to the previously acquired first change amount is smaller than a decrease amount threshold, or in a case where a decrease in amount of the newly acquired second change amount relative to the previously acquired second change amount is smaller than the decrease amount threshold.

5. The liquid discharge system according to claim 3, wherein the controller is configured to display the calculated lifetime, in a case where the calculated lifetime is equal to or less than the first filter threshold and is equal to or greater than a first filter notification threshold, the first filter notification threshold being smaller than the first filter threshold.

6. The liquid discharge system according to claim 3, wherein the controller is configured to perform a notification related to the first filter, in a case where the calculated lifetime is smaller than a first filter notification threshold, the first filter notification threshold being smaller than the first filter threshold.

7. The liquid discharge system according to claim 3, wherein the controller is configured to calculate the lifetime of the first filter, based on a slope of a temporal change in the first change amount or the second change amount.

8. The liquid discharge system according to claim 1, wherein the controller is configured to perform a notification related to the first filter, in a case where the first change amount or the second change amount is equal to or less than a first filter notification threshold, the first filter notification threshold being smaller than an initial value of the first change amount or the second change amount.

9. The liquid discharge system according to claim 1, wherein the controller is configured to:

calculate a lifetime of the first filter, in a case where the first change amount or the second change amount is equal to or smaller than an initial value of the first change amount or the second change amount and is larger than a first filter notification threshold, the first filter notification threshold being smaller than the initial value; and display the calculated lifetime.

10. The liquid discharge system according to claim 1, wherein the supply channel is connected to a storage tank, the discharge tank is connected to the storage tank, through a discharge channel for feeding the liquid in the discharge tank to the storage tank, and the controller is configured to determine whether a differential pressure between the supply tank and the discharge tank is normal, based on:

a comparison between the second change amount in a case where the liquid stored in the supply tank is fed to the discharge tank through the head channel and the second change amount in a case where the liquid stored in the storage tank is fed to the discharge tank through the supply channel and the head channel; or a comparison between the first change amount in a case where the liquid stored in the supply tank is fed to the discharge tank through the head channel and the first change amount in a case where the liquid stored in the supply tank is fed to the storage tank through the head channel and the discharge channel.

11. The liquid discharge system according to claim 1, wherein the controller is configured to:

calculate a lifetime of the second filter, based on the value based on the first change amount and the second change amount; and display that the state of the second filter is normal, in a case where the calculated lifetime is larger than a second filter threshold.

12. The liquid discharge system according to claim 11, wherein the controller is configured to display the calculated lifetime, in a case where the calculated lifetime is equal to or less than the second filter threshold and is equal to or greater than a second filter notification threshold, the second filter notification threshold being smaller than the second filter threshold.

13. The liquid discharge system according to claim 11, wherein the controller is configured to perform a notification related to the second filter, in a case where the calculated lifetime is smaller than a second filter notification threshold, the second filter notification threshold being smaller than the second filter threshold.

14. The liquid discharge system according to claim 11, wherein the controller is configured to calculate the lifetime of the second filter, based on a slope of a temporal change in the value based on the first change amount and the second change amount.

15. The liquid discharge system according to claim 1, wherein the controller is configured to perform a notification related to the second filter, in a case where the value based on the first change amount and the second change amount is equal to or less than a second filter notification threshold, the second filter notification threshold being smaller than an initial value of the value based on the first change amount and the second change amount.

16. The liquid discharge system according to claim 1, wherein the controller is configured to:

calculate a lifetime of the second filter, in a case where the value is equal to or less than an initial value of the value and is greater than a second filter notification threshold smaller than the initial value of the value, the value being based on the first change amount and the second change amount; and display the calculated lifetime.

17. The liquid discharge system according to claim 1, wherein the controller is configured to:

calculate a lifetime of the second filter, based on the rotational speed of the pump; and display that the state of the second filter is normal, in a case where the calculated lifetime is larger than a second filter threshold.

18. The liquid discharge system according to claim 17, wherein the controller is configured to display the calculated lifetime, in a case where the calculated lifetime is equal to or less than the second filter threshold and is equal to or greater than a second filter notification threshold, the second filter notification threshold being smaller than the second filter threshold.

19. The liquid discharge system according to claim 17, wherein the controller is configured to perform a notification related to the second filter, in a case where the calculated lifetime is smaller than a second filter notification threshold smaller than the second filter threshold.

20. The liquid discharge system according to claim 17, wherein the controller is configured to calculate the lifetime of the second filter, based on a slope of a temporal change in the rotational speed of the pump.

21. The liquid discharge system according to claim 1, wherein the controller is configured to perform a notification related to the second filter, in a case where the rotational speed of the pump is equal to or higher than a second filter notification threshold, the second filter notification threshold being larger than an initial value of the rotational speed of the pump.

22. The liquid discharge system according to claim 1, wherein the controller is configured to:

calculate a lifetime of the second filter, in a case where the rotational speed of the pump is equal to or higher than an initial value of the rotational speed of the pump and is lower than a second filter notification threshold, the second filter notification threshold being larger than the initial value of the rotational speed of the pump; and display the calculated lifetime.

23. A filter state determination method performed by a controller of a liquid discharge system configured to discharge liquid, wherein the liquid discharge system includes:

a head configured to discharge the liquid, the head having an inlet for supplying the liquid to the head and an outlet for discharging the liquid from the head;

a supply tank connected to the inlet;

a discharge tank connected to the outlet;

a pump configured to cause the liquid to flow, the liquid being in a supply channel for supplying the liquid to the supply tank;

a first filter located in a head channel extending from the supply tank to the discharge tank through the head;

a second filter located in the supply channel;

a first liquid amount sensor configured to detect an amount of the liquid stored in the supply tank; and a second liquid amount sensor configured to detect an amount of the liquid stored in the discharge tank, and the filter state determination method comprises:

determining a state of the first filter, based on a first change amount or a second change amount, the first change amount being amount of change in a detection value of the first liquid amount sensor in a prescribed period, the second change value being amount of change in a detection value of the second liquid amount sensor in a prescribed period; and determining a state of the second filter, based on a value or a rotational speed of the pump, the value being based on the first change amount and the second change amount.

* * * * *